US009544799B2

(12) United States Patent
Okita et al.

(10) Patent No.: US 9,544,799 B2
(45) Date of Patent: Jan. 10, 2017

(54) BASE STATION CONGESTION MANAGEMENT SYSTEM, AND BASE STATION CONGESTION MANAGEMENT METHOD

(71) Applicant: Hitachi, Ltd., Tokyo (JP)

(72) Inventors: Hideki Okita, Tokyo (JP); Yuki Sugimoto, Tokyo (JP); Katsuyuki Tsunami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/049,159

(22) Filed: Feb. 22, 2016

(65) Prior Publication Data

US 2016/0249242 A1 Aug. 25, 2016

(30) Foreign Application Priority Data

Feb. 24, 2015 (JP) ................. 2015-034013

(51) Int. Cl.
*H04B 17/00* (2015.01)
*H04W 24/00* (2009.01)
*H04W 24/08* (2009.01)
*H04W 28/02* (2009.01)

(52) U.S. Cl.
CPC ......... *H04W 24/08* (2013.01); *H04W 28/0284* (2013.01)

(58) Field of Classification Search
CPC ............ H04W 24/08; H04W 28/0215; H04W 28/0284; H04W 28/0289; H04W 28/08; H04W 48/06; H04B 17/382
USPC .......... 455/67.11, 422.1, 423, 424, 445, 446, 455/453, 560, 561; 370/230, 235, 328, 370/338
See application file for complete search history.

(56) References Cited

U.S. PATENT DOCUMENTS

| 7,991,404 | B2* | 8/2011 | Kagimoto | H04W 28/02 455/453 |
| 8,040,802 | B2* | 10/2011 | Ansari | H04L 47/10 370/231 |
| 8,185,120 | B2* | 5/2012 | Hassan | H04W 16/14 455/561 |
| 8,494,539 | B1* | 7/2013 | Surazski | H04L 12/5693 370/338 |
| 8,837,443 | B2* | 9/2014 | Yamada | H04L 47/12 370/230 |

(Continued)

OTHER PUBLICATIONS

3GPP TS 23.401 V12.6.0, Sep. 2014.

*Primary Examiner* — Quochien B Vuong
(74) *Attorney, Agent, or Firm* — Mattingly & Malur, PC

(57) ABSTRACT

A base station congestion management includes at least one data management unit to which a plurality of communication monitoring apparatuses input the base station bandwidth information and the subscriber information, a shared data store to store base station bandwidth usage information and information of list of subscriber existing within base station coverage, and a congestion management unit to determine whether congestion is occurring at the base station. The data management unit calculates a total value of a used bandwidth for each base station, updates the base station bandwidth usage information, and updates the list of subscriber identification information of a user terminal connected with the base station. The congestion management unit identifies the subscriber identification information of the user terminal connected with the base station where congestion is occurring.

15 Claims, 21 Drawing Sheets

(56) References Cited

U.S. PATENT DOCUMENTS

| | | | | |
|---|---|---|---|---|
| 8,923,117 B2* | 12/2014 | Racz | ............... | H04W 28/0247 |
| | | | | 370/229 |
| 2012/0257503 A1* | 10/2012 | Vrbaski | ............. | H04W 28/0205 |
| | | | | 370/235 |
| 2013/0021933 A1 | 1/2013 | Kovvali et al. | | |
| 2013/0170350 A1 | 7/2013 | Sarkar et al. | | |
| 2014/0086052 A1 | 3/2014 | Cai et al. | | |
| 2015/0296403 A1* | 10/2015 | Guan | ............... | H04W 28/0215 |
| | | | | 370/235 |

* cited by examiner

DISTRIBUTION HASH INFORMATION

| ECGI | Node |
|------|------|
| 3n+1 | 1 |
| 3n+2 | 2 |
| 3n+3 | 3 |

(n = 0, 1, ..., N-1)

BASE STATION BANDWIDTH THRESHOLD
INFORMATION
901      902     713

| ECGI | Bandwidth |
|------|-----------|
| 1    | 5 Mbps    |
| 2    | 5 Mbps    |
|      |           |

Fig. 9

INFORMATION OF LIST OF SUBSCRIBER EXISTING
WITHIN CONGESTED BASE STATION COVERAGE
1001     1002    714

| ECGI | IMSIs |
|------|-------|
| 2    | 3, 4  |
|      |       |
|      |       |

Fig. 10

LIST OF SUBSCRIBER EXISTING WITHIN
CONGESTED BASE STATION COVERAGE
715

| 3, 4 |
|------|

Fig. 11

BASE STATION CONGESTION MANAGEMENT SYSTEM, AND BASE STATION CONGESTION MANAGEMENT METHOD

CLAIM OF PRIORITY

The present application claims priority from Japanese patent application JP 2015-34013 filed on Feb. 24, 2015, the content of which is hereby incorporated by reference into this application.

BACKGROUND

The subject matter discussed herein relates a base station congestion management system configured to determine as to whether or not congestion is occurring at a base station in a network in which data from a user terminal is distributed by a plurality of base stations to a plurality of gateway apparatuses.

Mobile service providers work on an important issue of improving a user quality of experience (QoE: Quality of Experience) for data communication service. One of primary causes to lower data communication service QoE includes occurrences of congestions at wireless access network (RAN: Radio Area Network) of mobile network. When congestion occurs at a RAN, control signals from a subscriber's terminal will not reach a mobile core network (EPC: Evolved Packet Core), which causes a phenomenon where the probability of the subscriber's terminal not being connected to the network increases, and a phenomenon where the throughput of the data communication by the subscriber's terminal will particularly deteriorate. These phenomena will prevent the subscriber from using desirable network services such as connecting with the Internet, thereby lowering QoE of services.

Conventionally, a technique for giving a feedback to a mobile network or to a subscriber's terminal concerning the occurrence of congestion at a RAN in mobile network so as to control and eliminate the cause of the congestion has been available. Once the cause of the congestion is eliminated the network connection probability for the subscriber's terminal and the data communication throughput will be improved, and service QoE will also improve.

As a background art of the present technical field, US patent publication No. 2014/0086052 (Patent document 1), US patent publication No. 2012/0257503 (Patent document 2), US patent publication No. 2013/0021933 (Patent document 3), US patent publication No. 2013/0170350 (Patent document 4), and ETS ITS 123 401 V12. 6.0, September, 2014 (Non-patent document 1) are available.

Patent document 1 discloses a charging system that dynamically changes the policy related to the traffic by a subscriber and the charging rule. The charging system as disclosed in Patent document 1 collects RAN traffic data, determines whether or not congestion is occurring at each base station of the RAN, and, based on the determination result of congestion, creates a list of subscriber terminals that are connected to the base station in a congested state. Also, the charging system as disclosed in Patent document 1 outputs to a PCRF an instruction to change the policy related to the traffic by a subscriber and the charging rule for the subscriber terminal included in the created list. By this, it becomes possible to reduce the traffic at the base station in a congested state, and resolve the congested state of the base station.

Patent document 2 discloses a congestion notification system configured to notify, when congestion is occurring at a base station, the subscriber terminal that is connected to the base station where the congestion is occurring. The congestion notification system according to Patent document 2 manages a list of subscribers that are connected to a base station for each base station in a manner similar to the charging system as disclosed in Patent document 1. Also, for determining whether or not congestion is occurring at a base station in the congestion notification system as disclosed in Patent document 2, bandwidth that is being used or usable bandwidth for a base station is used as a determining index, for example.

Patent document 3 discloses a RAN transfer apparatus for determining whether or not congestion is occurring at each base station in a RAN. The RAN transfer apparatus as disclosed in Patent document 3 monitors an S1-U, which includes an interface for transmitting and receiving data packets between a base station and an S-GW (Serving Gateway), which is one of EPC gateway apparatuses, and an S11, which includes an interface for transmitting and receiving control signals between an MME (Mobility Management Entity), which is one of EPC gateway apparatuses, and the S-GW. Also, the RAN transfer apparatus correlates the data packet that flows through the S1-U, the base station with which the subscriber terminal that transmits and receives the data packet is connected, and the subscriber of the subscriber terminal based on the contents of the control signals acquired from the S11. Also, the RAN transfer apparatus calculates, based on the correlation between the packet and the base station, the bandwidth that is being used at each base station, and compares the calculated bandwidth with a predetermined threshold so as to determine whether or not congestion is occurring at each base station.

Patent document 4 discloses a specific method for identifying a subscriber that corresponds with a data packet that is used in the determination method of whether or not congestion is occurring at a base station as disclosed in Patent document 3. To be more specific, a service quality management server monitors the contents of the control signals that are transmitted and received at the S11, correlates, based on the results of monitoring, a GTP tunnel ID (TEID (Tunnel Endpoint ID)), which includes a flow ID of the S1-U with an IMSI (International Mobile Subscriber Identify), which includes an ID of a mobile service subscriber, and saves the same. Also, the QoS system disclosed in Patent document 4 searches a corresponding subscriber ID for each piece of data packet by using TEID as a search key, and identifies the corresponding subscriber.

Non-patent document 1 discloses that in order to secure the performance and reliability of the S-GW an MME selects, when a subscriber terminal connects with the network, the S-GW with which of a base station will be connected for each subscriber. In other words, Non-patent document 1 discloses that a base station distributes traffic to one S-GW out of a plurality of S-GWs for each subscriber.

[Patent document 1] US patent publication No. 2014/0086052

[Patent document 2] US patent publication No. 2012/0257503

[Patent document 3] US patent publication No. 2013/0021933

[Patent document 4] US patent publication No. 2013/0170350

[Non-patent document 1] ETS ITS 123 401 V12. 6.0, September, 2014

SUMMARY

Mobile business providers expand the mobile core network in order to accommodate the increase in the number of subscribers and to expand the service area. To be more specific, mobile business providers additionally arrange gateway apparatuses (S-GW and P-GW (PDN Gateway)) for connecting base stations with a packet data network (PDN: Packet Data Network).

When the S-GWs are additionally arranged, it is understood that one DPI (Deep Packet Inspection) will not be able to monitor all of the S-GWs because of the increase in the volume of the traffic of the S-GW transmitting and receiving data and geographical factors. Accordingly, a plurality of DPIs will, respectively, be required to monitor the S-GW traffic.

According to Non-patent document 1, since a base station distributes traffic to one S-GW out of a plurality of S-GWs for each subscriber, it will be impossible for each DPI to monitor the traffic of all of the subscribers. In such case, the bandwidth that is being used at each base station that each DPI is operable to comprehend will be smaller than the value of the actual bandwidth that is being used at each base station.

Accordingly, the DPI will be inoperable to accurately detect whether or not congestion is occurring at base stations. To be more specific, even when congestion is occurring at a base station the DPI will not be able to detect such congestion (i.e., False Negative).

An object of the present invention includes providing a base station congestion management system operable to accurately determine whether or not congestion is occurring at a base station.

To provide a typical example of the present invention, there is provided the base station congestion management system configured to determine whether congestion is occurring at a base station in a network in which a plurality of base stations distribute data from a user terminal to a plurality of gateway apparatuses, wherein a plurality of communication monitoring apparatuses collect base station bandwidth information which includes identification information of at least one base station which communicates with the gateway apparatus managed by each communication monitoring apparatus and a used bandwidth between the gateway apparatus and the at least one base station, and subscriber information which includes subscriber identification information of the user terminal and identification information of a base station with which the user terminal is connected, wherein the base station congestion management system includes: at least one data management unit to which the plurality of communication monitoring apparatuses input the base station bandwidth information and the subscriber information; a shared data store configured to store base station bandwidth usage information which registers therein a total value of a used bandwidth of the base station bandwidth information inputted to the data management unit from the plurality of communication monitoring apparatuses for each base station, and information of list of subscriber existing within base station coverage which registers therein a list of subscriber identification information of a user terminal connected with the base station for each base station; and a congestion management unit configured to determine whether congestion is occurring at the base station, wherein the data management unit calculates a total value of a used bandwidth for each base station based on the base station bandwidth information inputted from the communication monitoring apparatus, wherein the data management unit updates the base station bandwidth usage information in the shared data store based on the calculated total value, and wherein the data management unit updates the list of subscriber identification information of a user terminal connected with the base station of the information of the list of subscriber existing within base station coverage in the shared data store based on the subscriber information inputted from the communication monitoring apparatus, wherein the congestion management unit determine whether congestion is occurring at the base station based on the total value of the used bandwidth for each base station of the base station bandwidth usage information in the shared data store, and wherein the congestion management unit refers to the information of list of subscriber existing within base station coverage in the shared data and identifies the subscriber identification information of the user terminal connected with the base station where congestion is occurring.

The effects obtained by a typical example of the inventions disclosed herein will be described in a concise manner as below. This invention enables to provide a base station congestion management system operable to accurately determine whether congestion is occurring at a base station.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

The present invention can be appreciated by the description which follows in conjunction with the following figures, wherein:

FIG. 9 is an explanatory diagram of base station bandwidth threshold information according to embodiment 1;

FIG. 10 is an explanatory diagram of information of list of subscriber existing within congested base station coverage according to embodiment 1;

FIG. 11 is an explanatory diagram of a list of subscriber existing within congested base station coverage according to embodiment 1;

DETAILED DESCRIPTION OF THE EMBODIMENTS

Embodiment 1

The present embodiment will be described by using an example in which a plurality of data management servers (DMS) 302 are arranged, and base station bandwidth usage information 306 and information of list of subscriber existing within base station coverage 307 are stored in a distributed manner at a storage area of a plurality of nodes 305.

Figure 1:
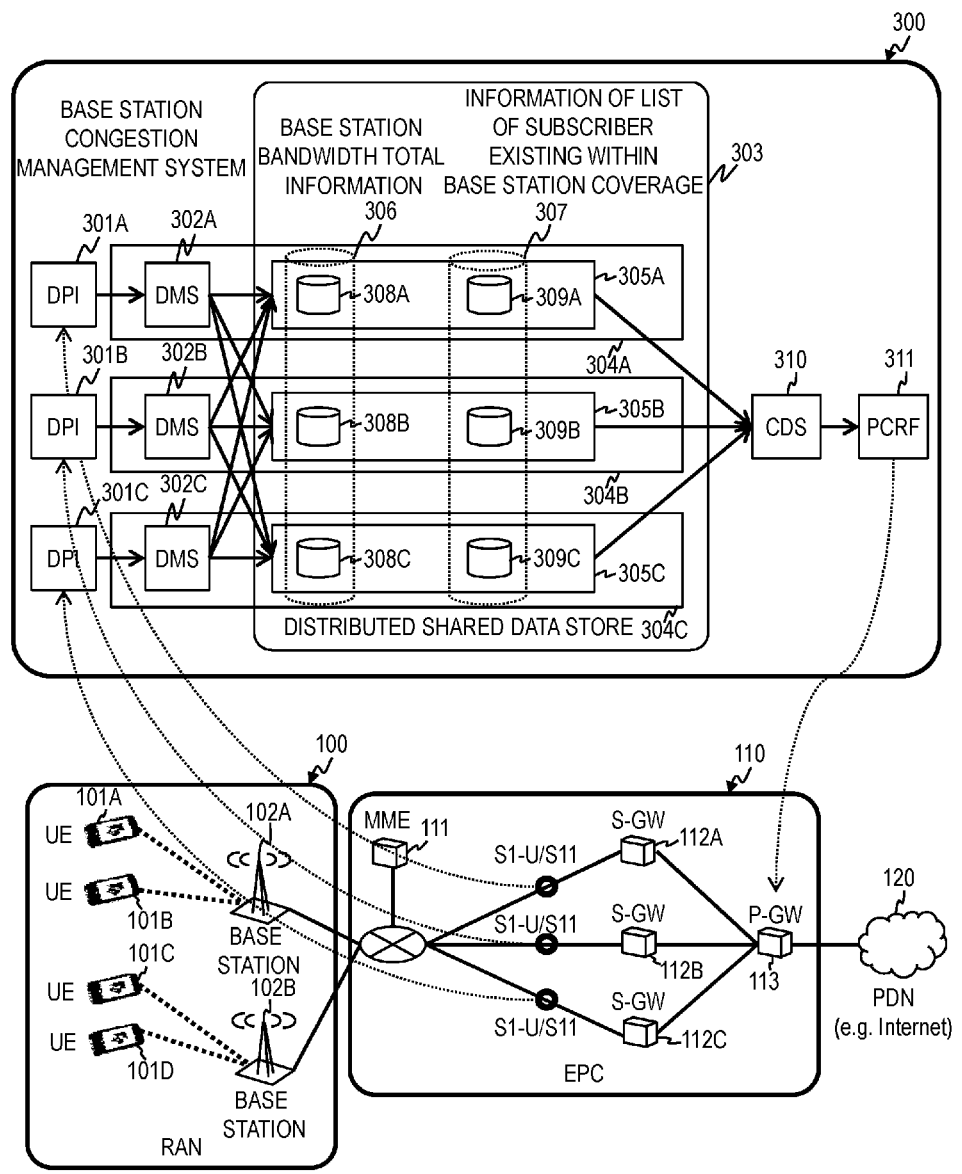
FIG. 1 is a configuration diagram of a network system according to embodiment 1.

FIG. 1 is a configuration diagram of a network system according to embodiment 1.

The present network system includes a wireless access network (RAN) 100, a mobile core network (EPC) 110, a packet data network (PDN) 120, and a base station congestion management system 300.

The wireless access network 100 includes use terminals 101A through 101D and base stations 102A and 102B. Note that when the user terminals 101A through 101D are referred collectively without distinguishing one from another, it will indicated as a user terminal 101, and when the base stations 102A and 102B are referred collectively without distinguishing one from another, it will indicated as a base station 102. The number of the user terminal 101 and that of the base station 102 are not limited to those depicted in FIG. 1.

The mobile core network 110 includes an MME 111, an S-GW 112A through 112C, and a P-GW 113. Note that when the S-GW 112A through 112C are referred collectively without distinguishing one from another, it will indicated as an S-GW 112. The numbers of the MME 111, the S-GW-112, and the P-GW 113 are not limited to those depicted in FIG. 1.

The base station 102 receives data transmitted from the user terminal 101, and distributes the data to one of the S-GWs 112. For example, the data from the user terminal 101 to the base station 102 will be distributed to the S-GW 112 based on an IMSI, which includes subscriber identification information.

The S-GW 112 transfers the data to the P-GW 113, which then transfers the same to the PDN 120.

The MME 111 manages the subscriber identification information of the user terminal 101 that is connected with each base station 102.

The base station congestion management system 300 includes DPIs (communication monitoring apparatus) 301A through 301C, data management servers (DMS: Data Management Server) 302A through 302C, a shared distributed data store (SDS: Shared Distributed Data store) 303, a base station congestion determination server (CDS: Congestion Detection Server) 310, and a PCRF 311. Note that when the DPIs 301A through 301C are referred collectively without distinguishing one from another, it will indicated as a DPI 301, and when the DMSs 302A through 302C are referred collectively without distinguishing one from another, it will indicated as a DMS 302.

The DPI 301 acquires base station bandwidth information and subscriber information. The base station bandwidth information includes the identification information of the base station 102 that distributes data to the S-GW 112 managed thereby and the bandwidth of the base station 102. The subscriber information includes the subscriber identification information, the identification information of the base station 102 with which the user terminal 101 of the subscriber is connected, and the identification information of the type of data that is transmitted/received by the user terminal 101 of the subscriber.

To be more specific, the DPI 301 acquires the base station bandwidth information and the subscriber information by monitoring the packet that flows at the SI-U, which includes an interface for transmitting and receiving data signal between the base station 102 and the S-GW 112 managed thereby, and the S11, which includes an interface for transmitting and receiving control signals between the MME 111 and the S-GW 112 managed thereby.

To be even more specific, the DPI 301 correlates and registers at a GTP tunnel management table the subscriber identification information (IMSI) and the GTP tunnel ID (TEID), which includes a flow ID of the S1-U, based on the monitoring results of the packet flowing at the S1-U and the S11. Then, the DPI 301 refers to the GTP tunnel management table, correlates the GTP flow at the S1-U and the subscriber identification information, measures the number of packets per unit of time for each GTP flow that is correlated with the subscriber identification information, and calculates the bandwidth occupied by the GTP flow. Further, the DPI 301 calculates the total value of the bandwidth that is occupied by the GTP for each base station 102 based on the information of the base station 102 with which the user terminal 101 of the subscriber is connected. Note that the subscriber information is specified based on the control signal that is transmitted and received at the S11.

The DMS 302 collects from the DPI 301 base station bandwidth usage information and the subscriber information, and writes the collected information at a shared distributed data store 303.

The shared distributed data store 303 includes nodes 305A through 305C. Note that when the nodes 305A through 305C are referred collectively without distinguishing one from another, it will indicated as a node 305. The node 305 includes a storage area which includes the base station bandwidth usage information 306, which includes the total value of the used bandwidth for each base station 102 registered therein, and the information of list of subscriber existing within base station coverage 307, which includes a list of the subscriber identification information of the user terminal 101 that is connected with the base station 102. The storage area of the node 305A includes an element data store 308A of the base station bandwidth usage information 306 and an element data store 309A of the information of list of subscriber existing within base station coverage 307; the storage area of the node 305B includes an element data store 308B of the base station bandwidth usage information 306 and an element data store 309B of the information of list of subscriber existing within base station coverage 307; and the storage area of the node 305C includes an element data store 308C of the base station bandwidth usage information 306 and an element data store 309C of the information of list of subscriber existing within base station coverage 307.

The DMS 302A and the node 305A operate on a physical server 304A; the DMS 302B and the node 305B operate on a physical server 304B; and the DMS 302C and the node 305C operate on a physical server 304C.

The DMS 302 writes the used bandwidth of the base station 102 at the base station bandwidth usage information 306 of the storage area of one of the nodes 305 by using the identification information of the base station 102 as a distribution key, and writes the subscriber identification information of the user terminal 101 that is connected with the base station 102 at the information of list of subscriber existing within base station coverage 307 of the storage area of any one of the nodes 305. Note that according to the present embodiment only the subscriber identification information of the user terminal 101 that transmits and receives data whose type of identification information included in the subscriber information from the DPI 301 indicates a specified type (e.g., video contents) is written in the information of list of subscriber existing within base station coverage 307.

Note that it is possible to use, as the identification information of the base station 102, an eNodeB ID, which includes the identification information configured to uniquely identify the specific base station 102, or an ECGI (E-UTRAN Cell Global ID) which includes the identification information configured to uniquely identify a cell of the base station 102 in a global sense. According to the present embodiment, the ECGI will be used as the identification information of the base station 102 for the description thereof.

The CDS 310 refers to the base station bandwidth usage information 306 and the information of list of subscriber existing within base station coverage 307 stored at the shared distributed data store 303 in order to determine as to whether or not congestion is occurring at each base station 102. Also, the CDS 310 generates a list of the subscriber identification information of the user terminal 101 that transmits and receives data of a specific type and that is connected with the base station 102 which has been determined to be where congestion is occurring, and notifies the PCRF 311 with the generated list of the subscriber identification information.

The PCRF 311 determines a subscriber who will be subject to the change of a control policy or a charging rule based on the list of subscriber identification information notified from the CDS 310. For example, the PCRF 311 changes the control policy or the charging rule in order to reduce the traffic at the base station 102 at which the congestion took place.

According to a conventional technique, while each DPI 301 determines as to whether or not congestion is occurring at each base station 102 based on the used bandwidth of the base station 102 as recognized by each DPI 301, such method is problematic in that it may allow congestion occurring at one of the base stations 102 to go undetected even though congestion is occurring at the base station 102. Hereinafter, this problem will be described in detail.

In FIG. 1 the user terminals 101A and 101B are connected with the base station 102A; the user terminals 101C and 101D are connected with the base station 102B; and the base station 102A distributes data from the user terminal 101A to the S-GW 112A and distributes data from the user terminal 101B to the S-GW 112B. Also, the base station 102B distributes data from the user terminal 101C to the S-GW 112A and distributes data from the user terminal 101D to the S-GW 112B.

That is, data from the user terminal 101A flows in to the S-GW 112A from the base station 102A, and data from the user terminal 101C flows in to the S-GW 112A from the base station 102B. Data from the user terminal 101B flows in to the S-GW 112B from the base station 102A, and data from the user terminal 101D flows in to the S-GW 112B from the base station 102B.

Note that the used bandwidth of the user terminal 101A includes 1 Mbps, the used bandwidth of the user terminal 101B includes 2 Mbps, the used bandwidth of the user terminal 101C includes 3 Mbps, and the used bandwidth of the user terminal 101D includes 4 Mbps.

Also, the DPI 301A manages the S-GW 112C, the DPI 301B manages the S-GW 112B, and the DPI 301C manages the S-GW 112C. The DPI 301A calculates the total value of the used bandwidth of the base station 102A as 1 Mbps, and calculates the total value of the used bandwidth of the base station 102B as 3 Mbps. The DPI 301B calculates the total value of the used bandwidth of the base station 102A as 2 Mbps, and calculates the total value of the used bandwidth of the base station 102B as 4 Mbps.

For example, in a case where each DPI 301 determines as to whether or not congestion is occurring at each base station 102 and the threshold for determining whether or not congestion is occurring includes 5 Mbps, it should be determined that congestion is occurring as the original used bandwidth of the base station 102A includes 3 Mbps and the original used bandwidth of the base station 102B includes 7

Mbps, however, the DPI 301A perceives the used bandwidth of the base station 102B to be 3 Mbps and the DPI 301B perceives the used bandwidth of the base station 102B to be 4 Mbps, which will result in a determination by both of the DPIs 301A and 301B that no congestion is occurring at the base station 102B. In other words, the determination result by the DPIs 301A and 301B may indicate false negatives.

According to the present embodiment, since each DMS 302 writes into the shared distributed data store 303 the total value of the used bandwidth of the base station 102 based on the base station bandwidth information collected from each DPI 301, the base station bandwidth usage information 306 stored at the shared distributed data store 303 includes the original bandwidth of each base station 102 registered therein. Accordingly, in a case where congestion is occurring at the base station 102, such congestion will be detected accurately.

Figure 2:
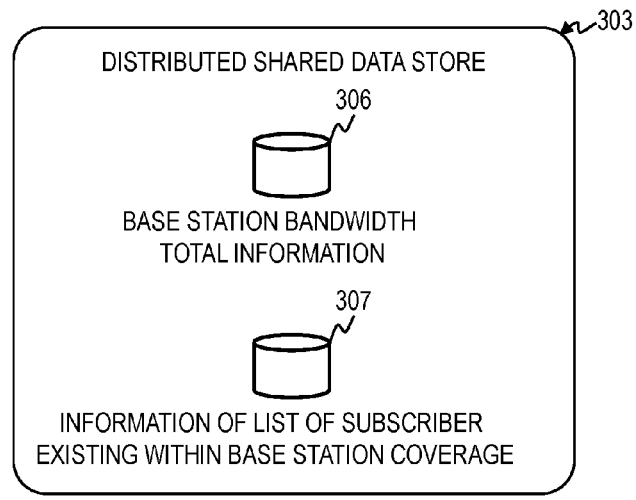
FIG. 2 is an explanatory diagram of a shared distributed data store according to embodiment 1.

FIG. 2 is an explanatory diagram of the shared distributed data store 303 according to embodiment 1.

The shared distributed data store 303 includes the base station bandwidth usage information 306 and the information of list of subscriber existing within base station coverage 307. The base station bandwidth usage information 306 includes the total value of the used bandwidth of each base station 102 registered therein, while the information of list of subscriber existing within base station coverage 307 includes the list of subscriber identification information of the user terminal 101 that is connected with each base station 102 and that transmits and receives data of a specific type registered therein. Note that the details of the base station bandwidth usage information 306 will be described with reference to FIG. 3, and the details of the information of list of subscriber existing within base station coverage 307 will be described with reference to FIG. 4.

Figure 3:
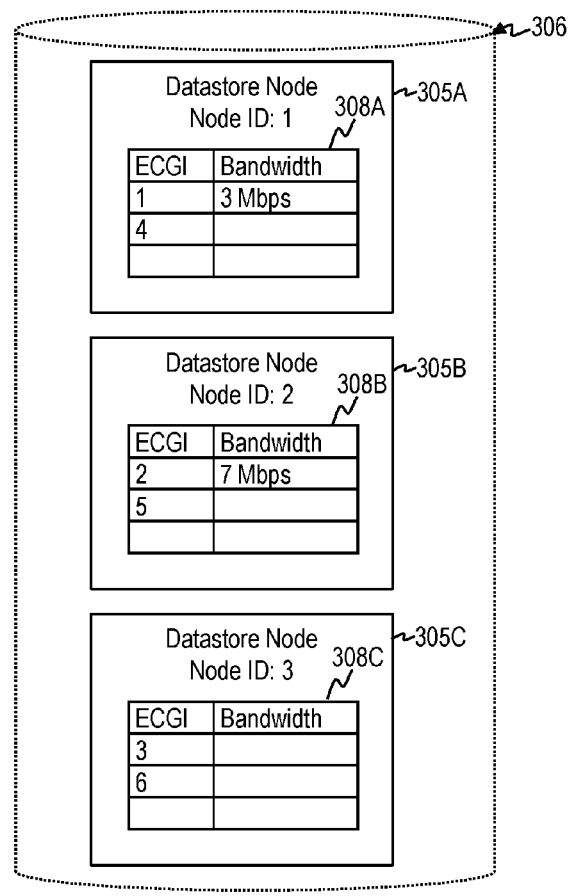
FIG. 3 is an explanatory diagram of base station bandwidth usage information according to embodiment 1.

FIG. 3 is an explanatory diagram of the base station bandwidth usage information 306 according to embodiment 1.

The base station bandwidth usage information 306 is stored in a distributed manner at the plurality of nodes 305A through 305C of the shared distributed data store 303. The element data store 308A of the base station bandwidth usage information 306 retained at the node 305A stores therein the total value of the used bandwidth of the base station 102 in which the remainder of dividing the ECGI by 3 is 1 (e.g., ECGI 1), the element data store 308B of the base station bandwidth usage information 306 retained at the node 305B stores therein the total value of the used bandwidth of the base station 102 in which the remainder of dividing the ECGI by 3 is 2 (e.g., ECGI 2), and the element data store 308C of the base station bandwidth usage information 306 retained at the node 305C stores therein the total value of the used bandwidth of the base station 102 in which the remainder of dividing the ECGI by 3 is 0 (e.g., ECGI 3). The base station bandwidth usage information 306 includes the ECGI and the Bandwidth; the ECGI registers therein the identification information of the base station 102; and the Bandwidth registers therein the total value of the used bandwidth of each base station 102.

Figure 4:
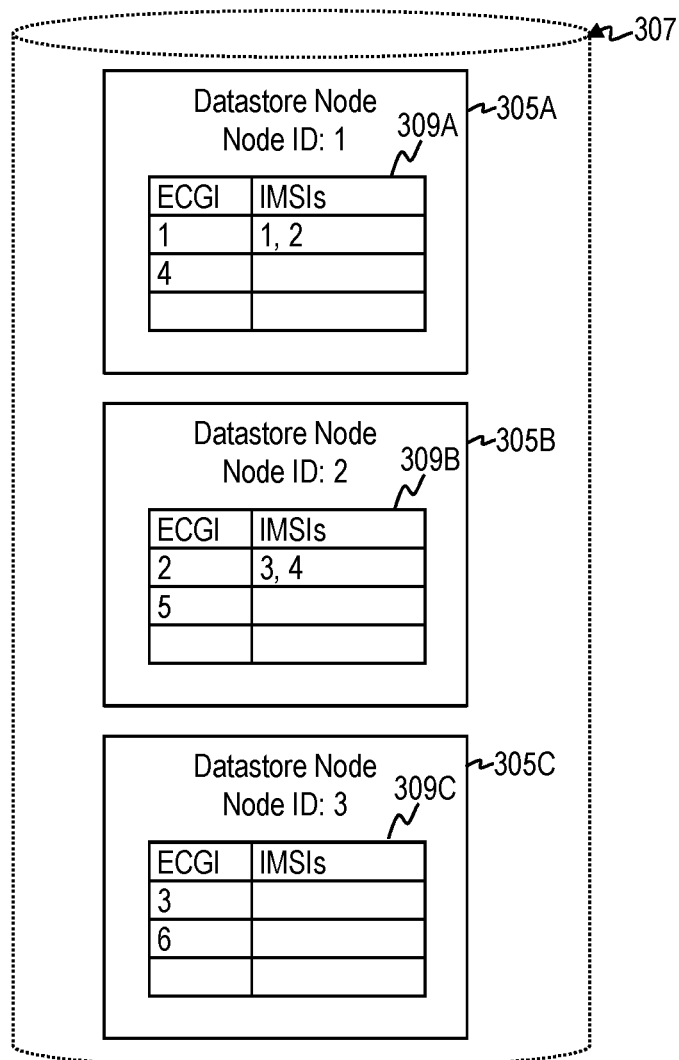
FIG. 4 is an explanatory diagram of information of list of subscriber existing within base station coverage according to embodiment 1.

FIG. 4 is an explanatory diagram of the information of list of subscriber existing within base station coverage 307 according to embodiment 1.

The information of list of subscriber existing within base station coverage 307 is stored in a distributed manner at the plurality of nodes 305A through 305C of the shared distributed data store 303. The element data store 309A of the information of list of subscriber existing within base station coverage 307 retained at the node 305A stores therein the list of subscriber identification information of the user terminal 101 that is connected with the base station 102 in which the remainder of dividing the ECGI by 3 is 1 (e.g., ECGI 1), the element data store 309B of the information of list of subscriber existing within base station coverage 307 retained at the node 305B stores therein the list of subscriber identification information of the user terminal 101 that is connected with the base station 102 in which the remainder of dividing the ECGI by 3 is 2 (e.g., ECGI 2), and the element data store 309C of the information of list of subscriber existing within base station coverage 307 retained at the node 305C stores therein the list of subscriber identification information of the user terminal 101 that is connected with the base station 102 in which the remainder of dividing the ECGI by 3 is 0 (e.g., ECGI 3).

The information of list of subscriber existing within base station coverage 307 includes the ECGI and the IMSIs; the ECGI includes the identification information of the base station 102 registered therein; and the IMSIs includes the subscriber identification information of all user terminals 101 that is connected with each base station 102 and that transmits and receives data of a specific type registered therein.

Figures 5, 6:
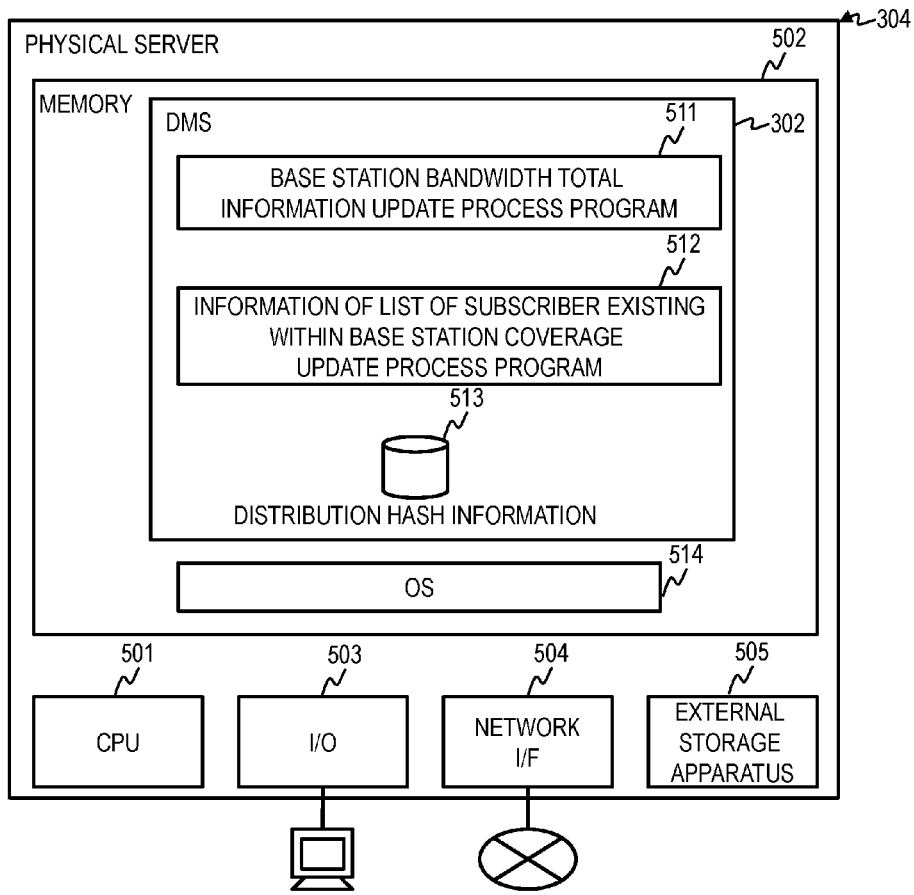
FIG. 5 is a hardware configuration diagram of a physical server on which a DMS operates according to embodiment 1.
FIG. 6 is an explanatory diagram of distribution hash information according to embodiment 1.

FIG. 5 is a hardware configuration diagram of the physical server 304 on which the DMS 302 operates according to embodiment 1.

The physical server 304 includes a CPU 501, a memory 502, an Input/Output (I/O) 503, a network interface (I/F) 504, and an external storage apparatus 505. Note that the CPU 501, the memory 502, the I/O 503, the network I/F 504, and the external storage apparatus 505 are connected with one another via a bus which is not illustrated in drawings herein.

The CPU 501 executes each program loaded to the memory 502 from the external storage apparatus 505, and reads and writes the information loaded to the memory 502 from the external storage apparatus 505.

The memory 502 includes a volatile storage area. The memory 502 stores therein a base station bandwidth usage information update process program 511, an information of list of subscriber existing within base station coverage update process program 512, a distribution hash information 513, and an OS 514. The base station bandwidth usage information update process program 511 executes a base station bandwidth usage information update process, which is configured to update the base station bandwidth usage information 306 based on the used bandwidth of the base station 102 acquired from the DPI 301. Also, the information of list of subscriber existing within base station coverage update process program 512 executes an information of list of subscriber existing within base station coverage update process, which is configured to update the information of list of subscriber existing within base station coverage 307, based on the subscriber information acquired from the DPI 301.

The distribution hash information 513 is used for referencing when determining the node 305 into which the bandwidth and the subscriber identification information are written by using the ECGI, which includes the identification information of the base station 102, as a distribution key. The distribution hash information 513 includes the correlation between the remainder of dividing the ECGI by 3 and the identification information of the node 305 that corresponds to the remainder registered therein. The details of the distribution hash information 513 will be described with reference to FIG. 6.

The OS 514 includes a program configured to control the physical server 304.

Note that the DMS 302 will be realized as the CPU 501 executes the base station bandwidth usage information update process program 511 and the information of list of subscriber existing within base station coverage update process program 512.

Also, while it is described with reference to FIG. 5 that the DMS 302 operates on the physical server 304 at which the node 305 operates, the DMS 302 may operate at a computer different from the physical server 304 at which the node 305 operates. Note that said computer only needs a general computer having a hardware configuration illustrated in FIG. 5.

The I/O 503 is connected with an output unit such as a display or the like, and an input unit such as a keyboard or the like. The network I/F 504 includes an interface that is connected with a network. The external storage apparatus 505 includes a nonvolatile storage medium at which each type of program and each type of information are stored.

FIG. 6 is an explanatory diagram of the distribution hash information 513 according to embodiment 1.

The distribution hash information 513 includes an ECGI 601 and a Node 602. The ECGI 601 is registered with 3n+1, 3n+2, and 3n+3 (n=0, 1, . . . N−1). In other words, the ECGI 601 is registered with the remainder of dividing ECGI by 3. The Node 602 is registered with the identification information of the node 305 having a storage area configured to write the bandwidth of the base station 102 and the subscriber identification information of the user terminal 101 that is connected with the base station 102.

Note that according to the example illustrated in FIG. 6, when the remainder of dividing the ECGI by 3 is 1, the node 305A whose identification information is "1" will be the node where the writing will be executed; when the remainder of dividing the ECGI by 3 is 2, the node 305B whose identification information is "2" will be the node where the writing will be executed; and when the remainder of dividing the ECGI by 3 is 3, the node 305C whose identification information is "3" will be the node where the writing will be executed.

Note that the distribution method for determining to which node the DMS 302 writes information is not limited to the method described above. For example, when the distribution method among the plurality of DMSs 302 will be synchronized, the writing object for the DMS 302 may be determined arbitrarily.

Figures 7, 8:
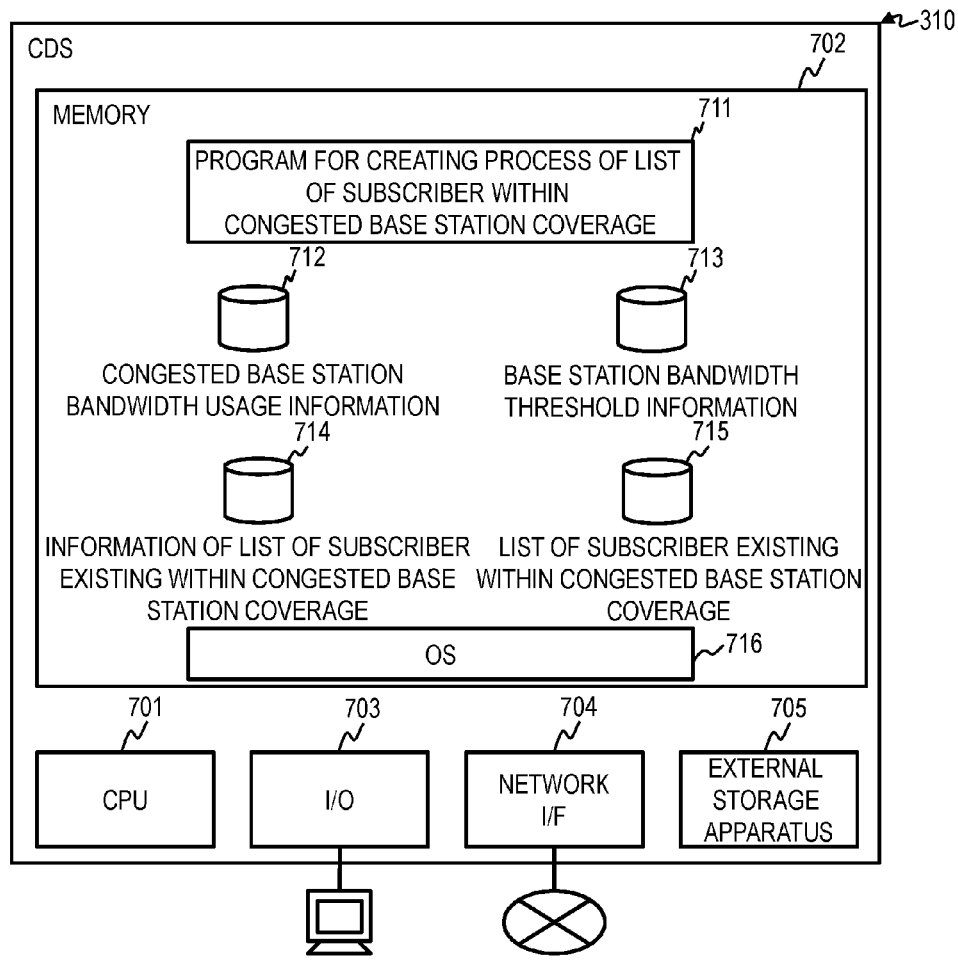
FIG. 7 is a hardware configuration diagram of a CDS according to embodiment 1.
FIG. 8 is an explanatory diagram of congested base station bandwidth usage information according to embodiment 1.

FIG. 7 is a hardware configuration diagram of the CDS 310 according to embodiment 1.

The CDS 310 includes a CPU 701, a memory 702, an I/O 703, a network I/F 704, an external storage apparatus 705. Note that the CPU 701, the memory 702, the I/O 703, the network I/F 704, and the external storage apparatus 705 are connected with one another via a bus which is not illustrated in the drawings herein.

Since the CPU 701, the memory 702, the I/O 703, the network I/F 704, and the external storage apparatus 705 are the same as the CPU 501, the memory 502, the I/O 503, the network I/F 504, and the external storage apparatus 505 illustrated in FIG. 5, the description thereof will be omitted.

The memory 702 stores therein a program for creating process of list of subscriber existing within congested base station coverage 711, congested base station bandwidth usage information 712, base station bandwidth threshold information 713, information of list of subscriber existing within congested base station coverage 714, a list of subscriber existing within congested base station coverage 715, and an OS 716.

The program for creating process of list of subscriber existing within congested base station coverage 711 refers to the base station bandwidth usage information 306 and base station bandwidth threshold information 713 of the shared distributed data store 303 in order to determine as to whether or not there is a base station whose used bandwidth is equal to or greater than a threshold in order to determine as to whether or not there is a base station 102 where congestion is occurring. The program for creating process of list of subscriber existing within congested base station coverage 711 acquires from the base station bandwidth usage information 306 the identification information of the base station 102 where congestion is occurring and the total value of the used bandwidth of the base station 102, and registers at the congested base station bandwidth usage information 712 the acquired identification information of the base station 102 and the total value of the used bandwidth.

Also, the program for creating process of list of subscriber existing within congested base station coverage 711 acquires from the information of list of subscriber existing within base station coverage 307 of the shared distributed data store 303 the identification information of the base station 102 where congestion is occurring and a list of the subscriber identification information of the user terminal 101 that is connected with the base station 102 and that transmits and receives data of a specific type. Then, the program for creating process of list of subscriber existing within congested base station coverage 711 registers at the information of list of subscriber existing within congested base station coverage 714 the acquired identification information of the base station and the list of the subscriber identification information.

Then, the program for creating process of list of subscriber existing within congested base station coverage 711 acquires all of the subscriber identification information registered at the information of list of subscriber existing within congested base station coverage 714, and registers at the list of subscriber existing within congested base station coverage 715 the acquired subscriber identification information.

The CDS 310 will be realized as the CPU 701 executes the program for creating process of list of subscriber existing within congested base station coverage 711.

The congested base station bandwidth usage information 712 includes the identification information of the base station 102 where congestion is occurring and the total value of the used bandwidth of the base station 102 registered therein. The details of the congested base station bandwidth usage information 712 will be described with reference to FIG. 8.

Base station bandwidth threshold information 713 includes the identification information of the base station 102 and a threshold which will be used for determining whether congestion is occurring at the base station 102 registered therein. The details of base station bandwidth threshold information 713 will be described with reference to FIG. 9.

The information of list of subscriber existing within congested base station coverage 714 includes the identification information of the base station 102 where congestion is occurring and the list of the subscriber identification information of the user terminal 101 that is connected with the base station 102 and that transmits and receives data of a specific type registered therein. The details of the information of list of subscriber existing within congested base station coverage 714 will be described with reference to FIG. 10.

The list of subscriber existing within congested base station coverage 715 includes the subscriber identification information of the user terminal 101 that is connected with all of the base stations where congestion is occurring and that transmits and receives data of a specific type registered therein. The details of the list of subscriber existing within congested base station coverage 715 will be described with reference to FIG. 11.

FIG. 8 is an explanatory diagram of the congested base station bandwidth usage information 712 according to embodiment 1.

The congested base station bandwidth usage information 712 includes an ECGI 801 and a Bandwidth 802. The ECGI 801 includes the ECGI that indicates the base station 102 where congestion is occurring, and the Bandwidth 802 includes the total value of the used bandwidth of the base station 102 registered therein. The congested base station bandwidth usage information 712 illustrated in FIG. 8 includes that congestion is occurring at the base station 102B whose ECGI includes 2 and the used bandwidth of the base station 102B is 7 Mbps registered therein.

FIG. 9 is an explanatory diagram of base station bandwidth threshold information 713 according to embodiment 1.

Base station bandwidth threshold information 713 includes an ECGI 901 and a Bandwidth 902. The ECGI 901 includes an ECGI that indicates each base station 102 registered therein, and the Bandwidth 902 includes a threshold which will be used for determining whether congestion is occurring at each base station 102 registered therein. Base station bandwidth threshold information 713 illustrated in FIG. 9 includes that the threshold of the base station 102A whose ECGI includes 1 and the threshold of the base station 102B whose ECGI includes 2 each are 5 Mbps registered therein.

FIG. 10 is an explanatory diagram of the information of list of subscriber existing within congested base station coverage 714 according to embodiment 1.

The information of list of subscriber existing within congested base station coverage 714 includes an ECGI 1001 and an IMSIs 1002. The ECGI 1001 includes the ECGI that indicates a base station 102 where congestion is occurring registered therein, and the IMSIs 1002 includes a list of the IMSI which includes the subscriber identification information of the user terminal 101 that is connected with the base station 102 where congestion is occurring and that transmits and receives data of a specific type registered therein. The information of list of subscriber existing within congested base station coverage 714 illustrated in FIG. 10 includes that the subscribers whose IMSI include 3 and 4 are connected with the base station 102B whose ECGI includes 2 and that the user terminals 101 of those subscribers transmit and receive data of a specific type registered therein.

FIG. 11 is an explanatory diagram of the list of subscriber existing within congested base station coverage 715 according to embodiment 1.

The list of subscriber existing within congested base station coverage 715 includes the IMSI, which includes the subscriber identification information of the user terminal 101 that is connected to all of the base stations 102 where congestion is occurring and that transmits and receives data of a specific type, registered therein. The list of subscriber existing within congested base station coverage 715 illustrated in FIG. 11 includes that the subscribers whose IMSI include 3 and 4 are connected with the base station 102 where congestion is occurring and the user terminals 101 of those subscribers transmit and receive data of a specific type registered therein.

Figure 12:
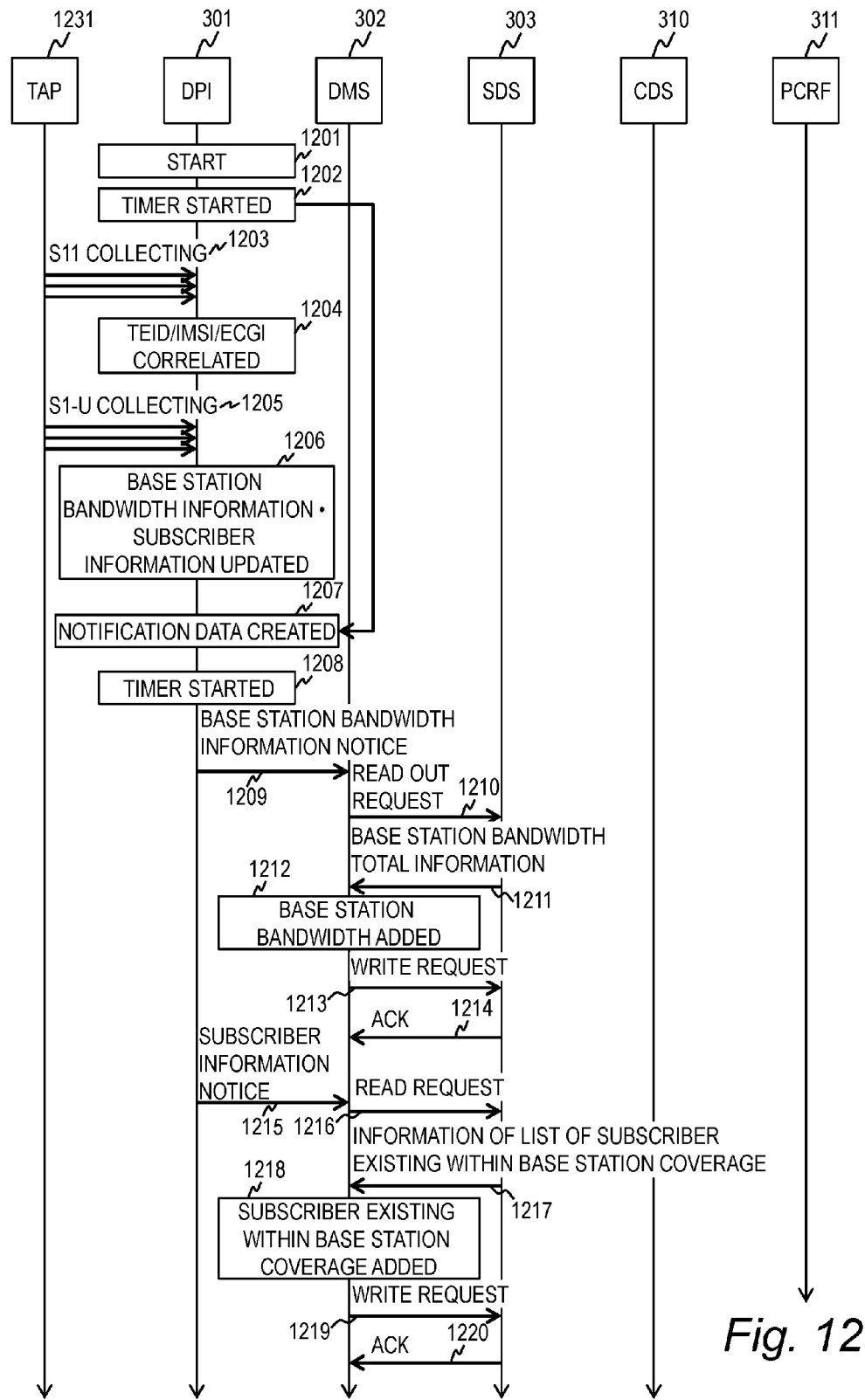
FIG. 12 is a sequence diagram of a process of writing to the shared distributed data store according to embodiment 1.

Next, a process of writing to the shared distributed data store 303 will be described with reference to FIG. 12. FIG. 12 is a sequence diagram of a process of writing to the shared distributed data store 303 according to embodiment 1.

Once the DPI 301 starts (1201), the DPI 301 sets up a timer configured to manage the timing at which the DPI 301 notifies the DMS 302 of the base station bandwidth information and the subscriber information (1202). For example, the DPI 301 may be configured to notify the DMS 302 of the base station bandwidth information and the subscriber information when a predetermined period of time (e.g., 10 seconds) has passed since the previous base station bandwidth information and the subscriber information were notified to the DMS 302.

Next, the DPI 301 collects from a tap device (TAP) 1231 a packet that was transmitted and/or received in S11 (1203), correlates by using a method such as one disclosed in Patent Document 3 or one disclosed in Patent Document 4, for example, the TEID which is configured to identify the GTP flow of the S1-U for each subscriber, the IMSI, which includes the subscriber identification information, and the ECGI, which includes the identification information of the base station 102, and retains the correlation (1204).

Next, the DPI 301 collects from the tap device 1231 a packet that was transmitted and/or received in S1-U (1205), refers to the correlation retained via the process of Step 1204, calculates the total value of the bandwidth of reception traffic for each base station 102 based on the size and the number of packets that are transmitted and/or received by the S1-U, and specifies the base station 102 with which each subscriber is connected (1206). Then, the DPI 301 creates data, which will be notified to the DMS 302, including the base station bandwidth information, which includes the total value of the bandwidth of each base station calculated in the process of Step 1206, and the subscriber information, which includes the identification information of the base station 102 with which each subscriber is connected as identified in the process of Step 1206 (1207). The base station bandwidth information includes the identification information of the base station 102 and the used bandwidth of the base station 102. The subscriber information includes the subscriber identification information, the identification information of the base station 102 with which the user terminal 101 of the subscriber is connected, and the identification information of the type of data transmitted and received by the user terminal 101 of the subscriber.

Then, when it is time for the timer to notify the DMS 302, the DPI 301 initializes the timer (1208), and notifies the DMS 302 of the base station bandwidth information created in the process of Step 1207 (1209).

The DMS 302 outputs, when the base station bandwidth information is notified, to the shared distributed data store 303 a read out request for a record which corresponds to the identification information of the base station 102 included in the base station bandwidth information that was included in the notification out of the records of the base station bandwidth usage information 306 (1210). To be more specific, the DMS 302 refers to the distribution hash information 513, identifies the node 305 having stored therein the base station bandwidth usage information that corresponds to the identification information of the base station 102 included in the base station bandwidth information that was included in the notification, and outputs the read out request to the identified node 305.

The shared distributed data store 303 reads out, when the read out request is inputted, from the element data store 308 of the base station bandwidth usage information 306 a record that corresponds to the identification information of the base station 102 of the read out request, and outputs the record that was read out to the DMS 302 (1211).

The DMS 302 adds, when the record of the base station bandwidth usage information 306 is inputted from the shared distributed data store 303, the used bandwidth included in the base station bandwidth information that was notified from the DPI 301 to the Bandwidth of the inputted record (1212). Then, the DMS 302 outputs to the shared distributed data store 303 a write request for writing the record, in which the used bandwidth of the base station bandwidth information notified from the DPI 301 was added in the process of Step 1212, to the element data store 308 of the base station bandwidth usage information 306 of the shared distributed data store 303 (1213). To be more specific, the DMS 302 outputs the write request to the node 305 which outputted the record to the DMS 302 in the process of Step 1211.

The shared distributed data store 303 writes, when the write request is inputted, the record which was requested in the write request to the element data store 308. Then, the shared distributed data store 303 sends an ACK to the DMS 302 when the writing went successfully (1214).

Also, the DPI 301 notifies the DMS 302 of the subscriber information created in the process of Step 1207 (1215).

The DMS 302 outputs, when the subscriber information is notified, to the shared distributed data store 303 a read out request for a record that corresponds to the identification information of the base station 102 included in the subscriber information that was notified out of the records of the information of list of subscriber existing within base station coverage 307 (1216). To be more specific, the DMS 302 refers to the distribution hash information 513 so as to identify the node 305 having stored therein the base station bandwidth usage information that corresponds to the identification information of the base station 102 included in the subscriber information that was notified, and outputs to the identified node 305 the read out request.

The shared distributed data store 303 reads out, when the read out request is inputted thereto, the record that corresponds to the identification information of the base station 102 in the read out request from the element data store 309 of the information of list of subscriber existing within base station coverage 307, and outputs to the DMS 302 the read out record (1217).

The DMS 302 adds, when the record of the information of list of subscriber existing within base station coverage 307 is inputted from the shared distributed data store 303, to the IMSIs of the inputted record the subscriber identification information of the user terminal 101 that transmits and receives data of a specific type out of the subscriber identification information that is included in the subscriber identification information that is notified by the DPI 301 (1218). Then, the DMS 302 outputs to the shared distributed data store 303 a write request for writing the record to which the subscriber identification information of the subscriber information that was inputted from the DPI 301 was added in the process of Step 1218, to the element data store 309 of the information of list of subscriber existing within base station coverage 307 of the shared distributed data store 303 (1219). To be more specific, the DMS 302 outputs the write request to the node 305 which outputted the record to the DMS 302 in the process of Step 1217.

The shared distributed data store 303 writes, when the write request is inputted, to the element data store 309 the record which was requested in the write request. Then, the shared distributed data store 303 sends an ACK to the DMS 302 when the writing went successfully (1220).

Figure 13:
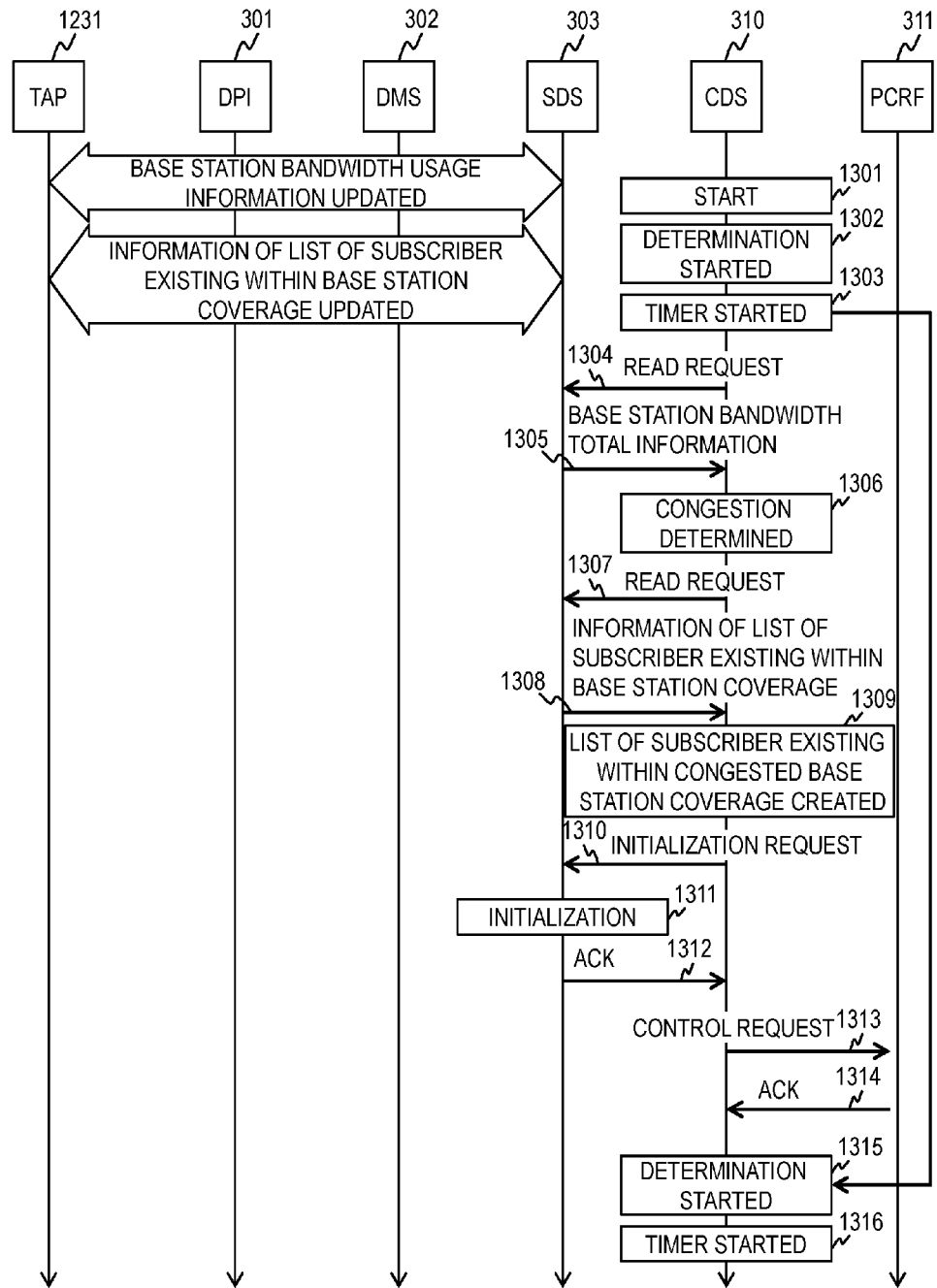
FIG. 13 is a sequence diagram of a process of the CDS according to embodiment 1.

Next, a process of the CDS 310 will be described with reverence to FIG. 13. FIG. 13 is a sequence diagram of the process of the CDS 310 according to embodiment 1.

Once the CDS 310 starts (1301), the CDS 310 starts a creating process of list of subscriber existing within congested base station coverage (1302) and sets up a timer configured to manage the timing at which the next creating process of list of subscriber existing within congested base station coverage starts (1303). Note that the creating process of list of subscriber existing within congested base station coverage includes a process of referring to the base station bandwidth usage information 306 and base station bandwidth threshold information 713 so as to determine as to whether or not there is a base station 102 where congestion is occurring, and a process of referring to the information of list of subscriber existing within base station coverage 307 so as to register at the list of subscriber existing within congested base station coverage 715 the subscriber identification information of those that are connected to all of the base stations 102 where congestion is occurring.

Next, the CDS 310 outputs to the node 305 of the shared distributed data store 303 the read out request for all of the records of the base station bandwidth usage information 306 of the shared distributed data store 303 (1304). Each node 305 of the shared distributed data store 303 outputs, when the read out request is inputted, to the CDS 310 all of the records that are registered at the element data store 308 of the base station bandwidth usage information 306 (1305).

The CDS 310 refers, when the base station bandwidth usage information is inputted, to base station bandwidth threshold information 713 and the base station bandwidth usage information that was inputted so as to determine as to whether or not congestion is occurring at the base station 102 (1306). To be more specific, when each total value of the used bandwidth registered at the Bandwidth of the ECGI of the record of the inputted base station bandwidth usage information is equal to or greater than the used bandwidth that is registered at the Bandwidth of the record corresponding to the ECGI of base station bandwidth threshold information 713, the CDS 310 determines that congestion is occurring at the base station 102 that is identified by the ECGI.

When it is determined in the process of Step 1306 that there is a base station 102 where congestion is occurring, the CDS 310 extracts from the inputted base station bandwidth usage information the record in which the identification of the base station 102 where congestion is occurring is registered, and registers the extracted record at the congested base station bandwidth usage information 712.

Next, the CDS 310 outputs to the node 305 of the shared distributed data store 303 a read out request for all of the records of the information of list of subscriber existing within base station coverage 307 of the shared distributed data store 303 (1307). The node 305 of the shared distributed data store 303 outputs, when the read request is inputted, to the CDS 310 all of the records registered at the element data store 309 of the information of list of subscriber existing within base station coverage 307 of each node 305 as information of list of subscriber existing within base station coverage (1308).

The CDS 310 refers, when the information of list of subscriber existing within base station coverage is inputted, to the congested base station bandwidth usage information 712 and the inputted information of list of subscriber existing within base station coverage so as to create the list of subscriber existing within congested base station coverage 715 (1309). To be more specific, the CDS 310 acquires the record of the information of list of subscriber existing within base station coverage that corresponds with the identification information of the base station 102 registered at the ECGI of the inputted information of list of subscriber existing within base station coverage, and registers the acquired record at the information of list of subscriber existing within congested base station coverage 714. Then, the CDS 310 acquires the subscriber identification information that is registered at the information of list of subscriber existing within congested base station coverage 714, and registers the acquired subscriber identification information at the list of subscriber existing within congested base station coverage 715 so as to create the list of subscriber existing within congested base station coverage 715.

Next, the CDS 310 outputs to each node 305 of the shared distributed data store 303 an initialization request for initializing the base station bandwidth usage information 306 and the information of list of subscriber existing within base station coverage 307 (1310).

Each node 305 of the shared distributed data store 303 initializes, when the initialization request is inputted, the base station bandwidth usage information 306 and the information of list of subscriber existing within base station coverage 307 (1311), and outputs an ACK to the CDS 310 (1312). Accordingly, since the CDS 310 initializes the base station bandwidth usage information 306 and the information of list of subscriber existing within base station coverage 307 of the shared distributed data store 303 at a predetermined timing, it becomes possible to prevent the value of bandwidth received at a different period of time from being added to the base station bandwidth usage information 306 in an overlapping manner. Also, it becomes possible to prevent the base station bandwidth usage information 306 and the information of list of subscriber existing within base station coverage 307 from overflowing.

The CDS 310 outputs, when the ACK is inputted, to the PCRF 311 a control request that includes the list of subscriber existing within congested base station coverage 715 (1313). The PCRF 311 changes, when the control request is inputted, the control policy or the charging rule for the subscriber of the list of subscriber existing within congested base station coverage 715 included in the control request, and outputs an ACK to the CDS 310 (1314). According to the present embodiment, since the information of list of subscriber existing within base station coverage 307 of the shared distributed data store 303 includes the subscriber identification information of the user terminal 101 that is connected to the base station 102 and that transmits and receives data of a specific type, the PCRF 311 limits the subscriber who will be subject to the change of the control policy or the charging rule to those with the user terminal 101 that is connected to the base station 102 where congestion is occurring and that transmits and receives data of a specific type. By this, the control policy or the charging rule will not be changed for the subscriber with a user terminal 101 that transmits and receives data other than the specific type.

The CDS 310 will standby, when the ACK is inputted, until the next timing the timer indicates it is time to execute the creating process of list of subscriber existing within congested base station coverage. Then, when the timer indicates it is time to execute the creating process of list of subscriber existing within congested base station coverage next, the CDS 310 restarts the creating process of list of subscriber existing within congested base station coverage (1315), and resets the timer (1316). The CDS 310 repeatedly executes the above process at predetermined time intervals.

Note that the predetermined time intervals for executing the creating process of list of subscriber existing within congested base station coverage are to be set longer than the time intervals in which the CDS 310 outputs the base station bandwidth information and the subscriber information to the DMS 302. Accordingly, it becomes possible to execute the creating process of list of subscriber existing within congested base station coverage after the base station bandwidth usage information 306 and the information of list of subscriber existing within base station coverage 307 of the shared distributed data store 303 are updated.

Figure 14:
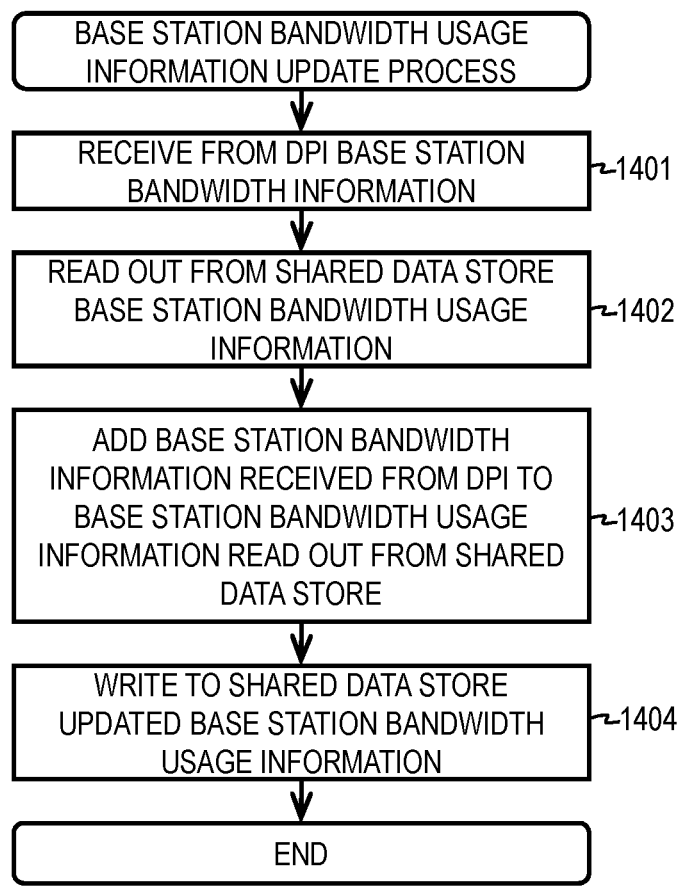
FIG. 14 is a flowchart of a base station bandwidth usage information update process program which is executed by a base station bandwidth usage information update process program of the DMS according to embodiment 1.

FIG. 14 is a flowchart of the base station bandwidth usage information update process program which is executed by the base station bandwidth usage information update process program 511 of the DMS 302 according to embodiment 1.

Firstly, in the base station bandwidth usage information update process program 511 the base station bandwidth information, which is displayed on a table which registered therein a record that includes the identification information of the base station 102 and the used bandwidth of the base station 102, is inputted from the DPI 301 (1401). Next, the base station bandwidth usage information update process program 511 reads out the record that corresponds with the identification information of each base station 102 that is included in the inputted base station bandwidth information out of the record of the base station bandwidth usage information 306 of the shared distributed data store 303 (1402). In the process of Step 1402, the base station bandwidth usage information update process program 511 refers to the distribution hash information 513 so as to seek whether or not to output a read out request to any one of the nodes 305 of the shared distributed data store 303 for each piece of identification information of the base station included in the inputted base station bandwidth information.

Next, the base station bandwidth usage information update process program 511 adds to the total value of the used bandwidth that is registered at the Bandwidth of the record of the base station bandwidth usage information 306 that was read out in the process of Step 1402 the value of the used bandwidth of the record in which the identification information of the base station 102 corresponds with the identification information of the base station 102 of the record of the base station bandwidth usage information 306 that was read out out of the record of the base station bandwidth information inputted at the DMS 302 (1403).

Next, the base station bandwidth usage information update process program 511 overwrites the record of the base station bandwidth usage information in which the value of the used bandwidth is added to the base station bandwidth usage information 306 of the shared distributed data store 303 (1404), and ends the base station bandwidth usage information update process.

Note that when the base station bandwidth information that was inputted to the DMS 302 includes used bandwidth of a plurality of base stations, the DMS 302 repeatedly executes the processes of Step 1403 and Step 1404 until the processes of Step 1403 and Step 1404 are executed to the identification information of all of the base stations that are included in the inputted base station bandwidth information.

The plurality of DMSs 302 execute the base station bandwidth usage information update process illustrated in FIG. 14 at the timing when the base station bandwidth information is received from the DPI 301. That is, the base station bandwidth usage information update process illustrated in FIG. 14 is executed in a parallel manner by the plurality of DMSs 302. Accordingly, the base station bandwidth usage information update process can increase the speed of the process compared to executing the base station bandwidth usage information update process by a single DMS 302.

While the DMS 302 is writing or reading the element data store 308 of the base station bandwidth usage information 306 of a particular node 305, this element data store 308 cannot be accessed by any other DMSs 302. According to the present embodiment, since the base station bandwidth usage information 306 is stored at the plurality of nodes 305 in a distributed manner, the possibility of the DMS 302 not being able to access the element data store 308 is reduced, which is operable to increase the speed of the base station bandwidth usage information update process.

Since one of the examples in the present embodiment assumes the base station 102 being applicable to a vast number of wireless access networks 100, improving the speed of the base station bandwidth usage information update process is an important issue.

Figure 15:
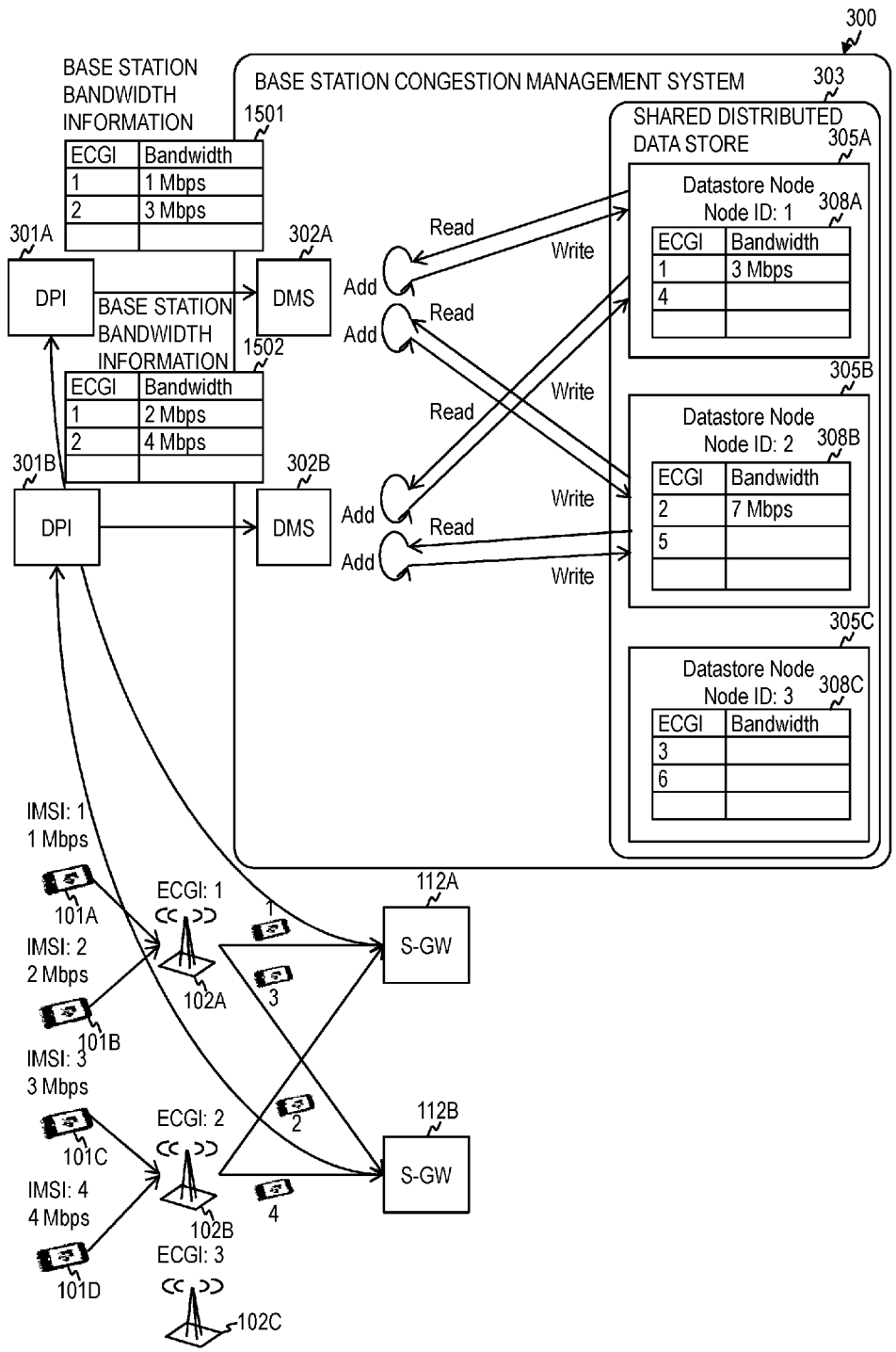
FIG. 15 is an explanatory diagram of the base station bandwidth usage information update process according to embodiment 1.

FIG. 15 is an explanatory diagram of the base station bandwidth usage information update process according to embodiment 1.

The DPI 301A notifies the DMS 302A of base station bandwidth information 1501 indicating that the used bandwidth of the base station 102A (ECGI 1) and the used bandwidth of the base station 102B (ECGI 2) are 1 Mbps and 3 Mbps, respectively. Meanwhile, DPI 301B notifies the DMS 302B of base station bandwidth information 1502 indicating that the used bandwidth of the base station 102A (ECGI 1) and the used bandwidth of the base station 102B (ECGI 2) are 2 Mbps and 4 Mbps, respectively.

The DMS 302A and the DMS 302B read out from the element data store 308A of the node 305A the record that corresponds with the ECGI 1 of the base station bandwidth usage information 306 and from the element data store 308B of the node 305B the record that corresponds with the ECGI 2 of the base station bandwidth usage information 306 in accordance with the contents registered at the distribution hash information 513.

Then, the DMS 302A and the DMS 302B add the value of the used bandwidth of the base station bandwidth information 1501 and the base station bandwidth information 1502 inputted from the DPI 301A and the DPI 301B to the total value of the used bandwidth of the record that was read out, and overwrite to the base station bandwidth usage information 306 the result of the addition.

For example, a case where the DMS 302A executes the base station bandwidth usage information update process first, and then the DMS 302B executes the base station bandwidth usage information update process will be explained. In an initial state 0 Mbps is registered for the used bandwidth of the record that corresponds to the ECGI 1 of the element data store 308A of the node 305A and the used bandwidth of the record that corresponds to the ECGI 2 of the element data store 308B of the node 305B. When the DMS 302A executes the base station bandwidth usage information update process, 1 Mbps will be registered for the used bandwidth of the record that corresponds with the ECGI 1 of the element data store 308A of the node 305A, and 3 Mbps will be registered for the used bandwidth of the record that corresponds with the ECGI 2 of the element data store 308B of the node 305B. Then, when the DMS 302B executes the base station bandwidth usage information update process, 2 Mbps will be added to the used bandwidth (1 Mbps) of the record that corresponds with the ECGI 1 of the element data store 308A of the node 305A, and 3 Mbps will be registered at the used bandwidth of the record. Also, 4 Mbps will be added to the used bandwidth (3 Mbps) of the record that corresponds with the ECGI 2 of the element data store 308B of the node 305B, and 7 Mbps will be registered at the used bandwidth of the record. Accordingly, the base station bandwidth information inputted from a plurality of DPIs 301 to the plurality of DMSs 302 will be aggregated such that the total value of the used bandwidth for each base station 102 will be registered at the base station bandwidth usage information 306.

Figure 16:
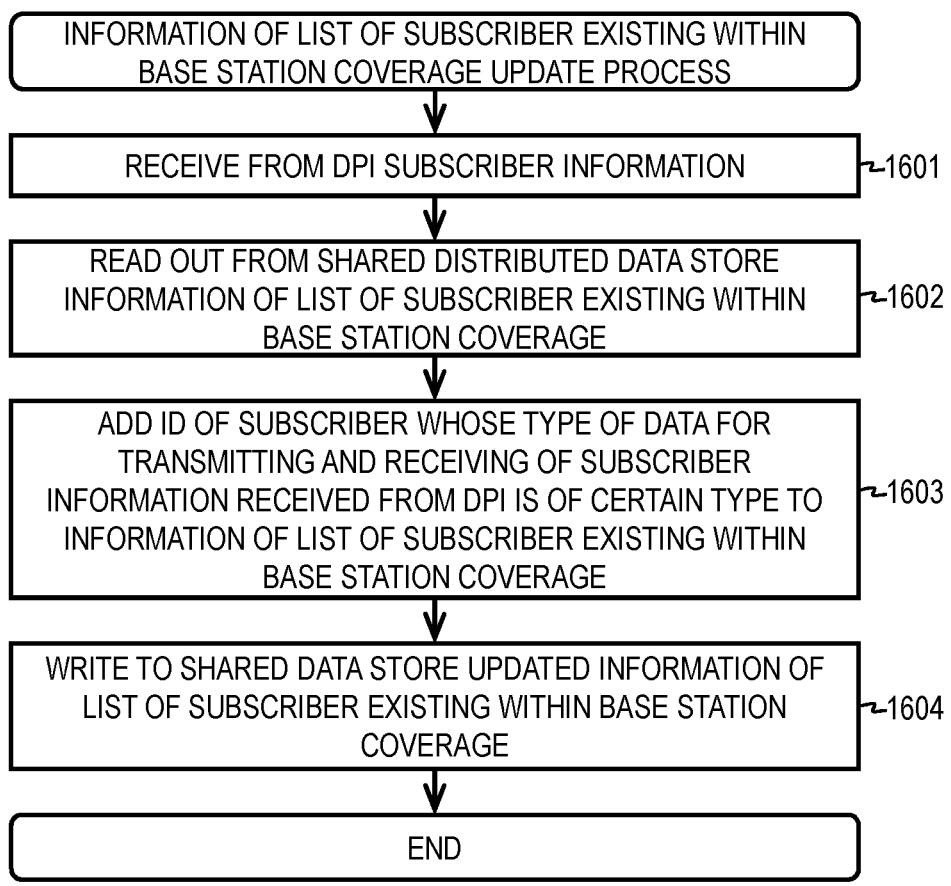
FIG. 16 is a flowchart of an information of list of subscriber existing within base station coverage update process which is executed by an information of list of subscriber existing within base station coverage update process program of the DMS according to embodiment 1.

FIG. 16 is a flowchart of the information of list of subscriber existing within base station coverage update process which is executed by the information of list of subscriber existing within base station coverage update process program 512 of the DMS 302 according to embodiment 1.

Firstly, the information of list of subscriber existing within base station coverage update process program 512 the subscriber information which is displayed on a table which registered therein a record that includes the subscriber identification information, the identification information of the base station 102 with which the use terminal 101 of the subscriber is connected, and the identification information of the type of the data transmitted and received by the user terminal 101 of the subscriber is inputted from the DPI 301 (1601).

Next, the information of list of subscriber existing within base station coverage update process program 512 reads out only the record that corresponds with the identification information of the base station 102 included in the inputted subscriber information out of the record of the information of list of subscriber existing within base station coverage 307 of the shared distributed data store 303 (1602). In the process of Step 1602, the information of list of subscriber existing within base station coverage update process program 512 refers to the distribution hash information 513 so as to seek whether or not to output a read out request to any one of the nodes 305 of the shared distributed data store 303 for each piece of identification information of the base station included in the inputted subscriber information.

Next, the information of list of subscriber existing within base station coverage update process program 512 adds to the list of the subscriber identification information that is registered at the IMSIs of the record of the information of list of subscriber existing within base station coverage 307 that was read out in the process of Step 1602 the identification information of the subscriber that transmits and receives data of a specific type out of the subscriber identification information of the record where the identification information of the base station 102 in the inputted subscriber information corresponds with the identification information of the base station 102 of the record in the information of list of subscriber existing within base station coverage 307 that was read out (1603).

Next, the information of list of subscriber existing within base station coverage update process program 512 overwrites the record of the information of list of subscriber existing within base station coverage 307 to which the subscriber identification information is added to the information of list of subscriber existing within base station coverage 307 of the shared distributed data store 303 (1604), and ends the information of list of subscriber existing within base station coverage update process.

Note that when the subscriber information that was inputted to the DMS 302 includes used bandwidth of a plurality of base stations, the DMS 302 repeatedly executes the processes of Step 1603 and Step 1604 until the processes of Step 1603 and Step 1604 are executed to the identification information of all of the base stations that are included in the inputted subscriber information.

Also, since the information of list of subscriber existing within base station coverage update process is executed in a parallel manner by the plurality of DMSs 302, it becomes possible to increase the speed of the information of list of subscriber existing within base station coverage update process. Also, since the information of list of subscriber existing within base station coverage 307 is stored at the plurality of nodes 305 in a distributed manner, it becomes possible to increase the speed of the information of list of subscriber existing within base station coverage update process.

Figure 17:
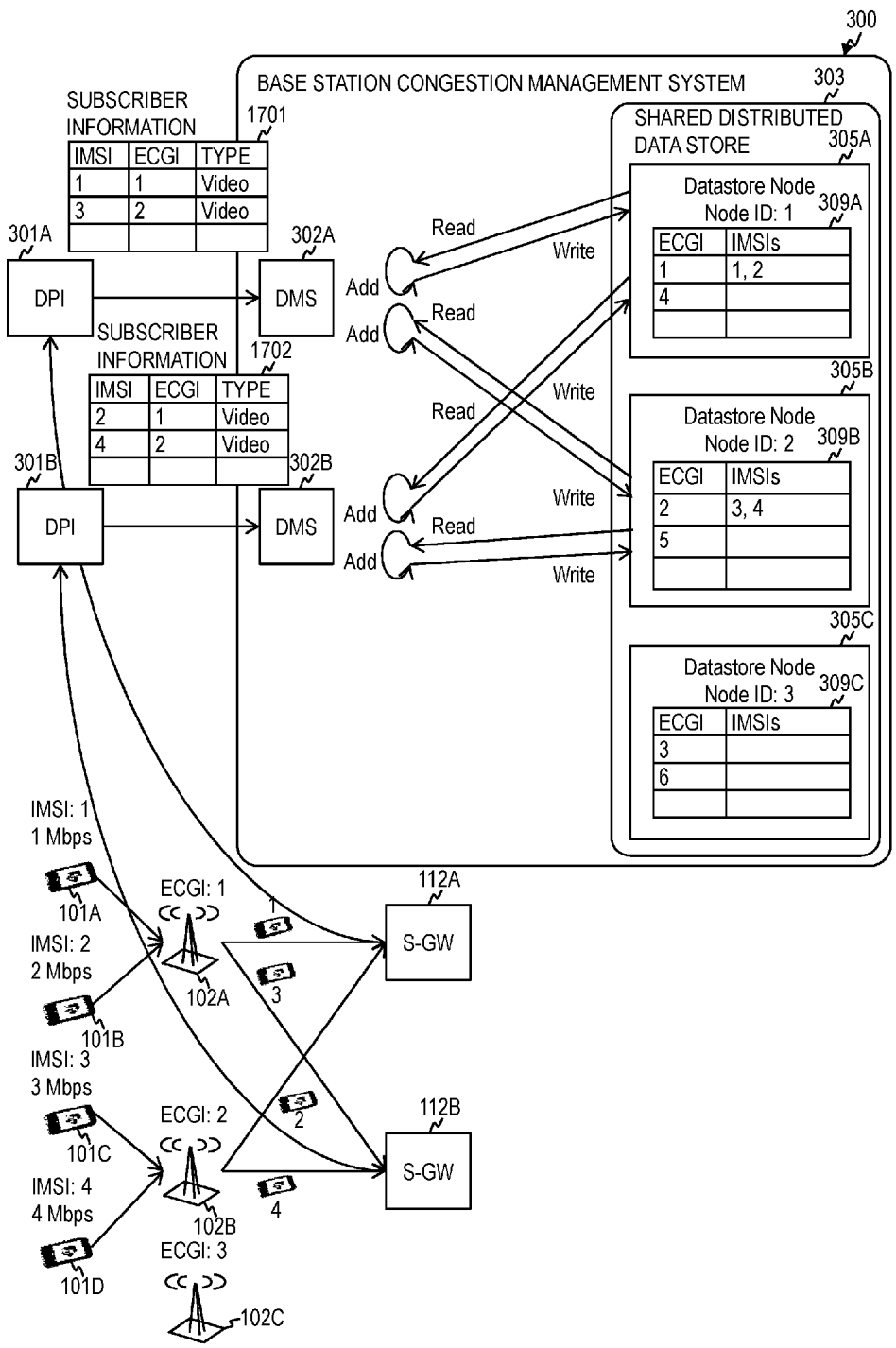
FIG. 17 is an explanatory diagram of the information of list of subscriber existing within base station coverage update process according to embodiment 1.

FIG. 17 is an explanatory diagram of the information of list of subscriber existing within base station coverage update process according to embodiment 1.

The DPI 301A notifies the DMS 302A with subscriber information 1701 which includes that the user terminal 101A of a subscriber (IMSI 1) is connected with the base station 102A (ECGI 1) and the user terminal 101C of a subscriber (IMSI 3) is connected with the base station 102B (ECGI 2), and that the type of data that is transmitted and received includes video. Meanwhile, the DPI 301B notifies the DMS 302B with subscriber information 1702 which includes that the user terminal 101B of a subscriber (IMSI 2) is connected with the base station 102A (ECGI 1) and the user terminal 101D of a subscriber (IMSI 4) is connected with the base station 102B (ECGI 2), and that the type of data that is transmitted and received includes video.

The DMS 302A reads out from the element data store 309A of the node 305A a record that corresponds with the ECGI 1 of the information of list of subscriber existing within base station coverage 307, and the DMS 302B reads out from the element data store 309B of the node 305B a record that corresponds with the ECGI 2 of the information of list of subscriber existing within base station coverage 307 in accordance with the contents registered at the distribution hash information 513.

Then, the since all of the types included in the subscriber information 1701 and 1702 include video, the DMS 302A and DMS 302B respectively add to the list of the subscriber identification information of the record that was read out the subscriber identification information of the subscriber information 1701 and 1702 inputted from the DPI 301A and DPI 301B, and overwrite to the information of list of subscriber existing within base station coverage 307 the result of addition.

For example, a case where the DMS 302A executes the information of list of subscriber existing within base station coverage update process first, and then the DMS 302B executes the information of list of subscriber existing within base station coverage update process will be explained. In an initial state nothing is registered for the subscriber identification information (IMSIs) of the record that corresponds to the ECGI 1 of the element data store 309A of the node 305A and nothing is registered for the subscriber identification information (IMSIs) of the record that corresponds to the ECGI 2 of the element data store 309B of the node 305B. When the DMS 302A executes the information of list of subscriber existing within base station coverage update process, IMSI 1 will be registered for the identification information (IMSIs) of the record that corresponds with the ECGI 1 of the element data store 309A of the node 305A, and IMSI 3 will be registered for the identification information (IMSIs) of the record that corresponds with the ECGI 2 of the element data store 309B of the node 305B. Then, when the DMS 302B executes the information of list of subscriber existing within base station coverage update process, the IMSI 2 will be added to the subscriber identification information (IMSIs) of the record that corresponds with the ECGI 1 of the element data store 309A of the node 305A, and the IMSI 1 and the IMSI 2 will be registered at the subscriber identification information (IMSIs) of the record. Also, the IMSI 4 will be added to the subscriber identification information (IMSIs) of the record that corresponds with the ECGI 2 of the element data store 309B of the node 305B, and the IMSI 3 and the IMSI 4 will be registered at the subscriber identification information (IMSIs) of the record.

Figure 18:
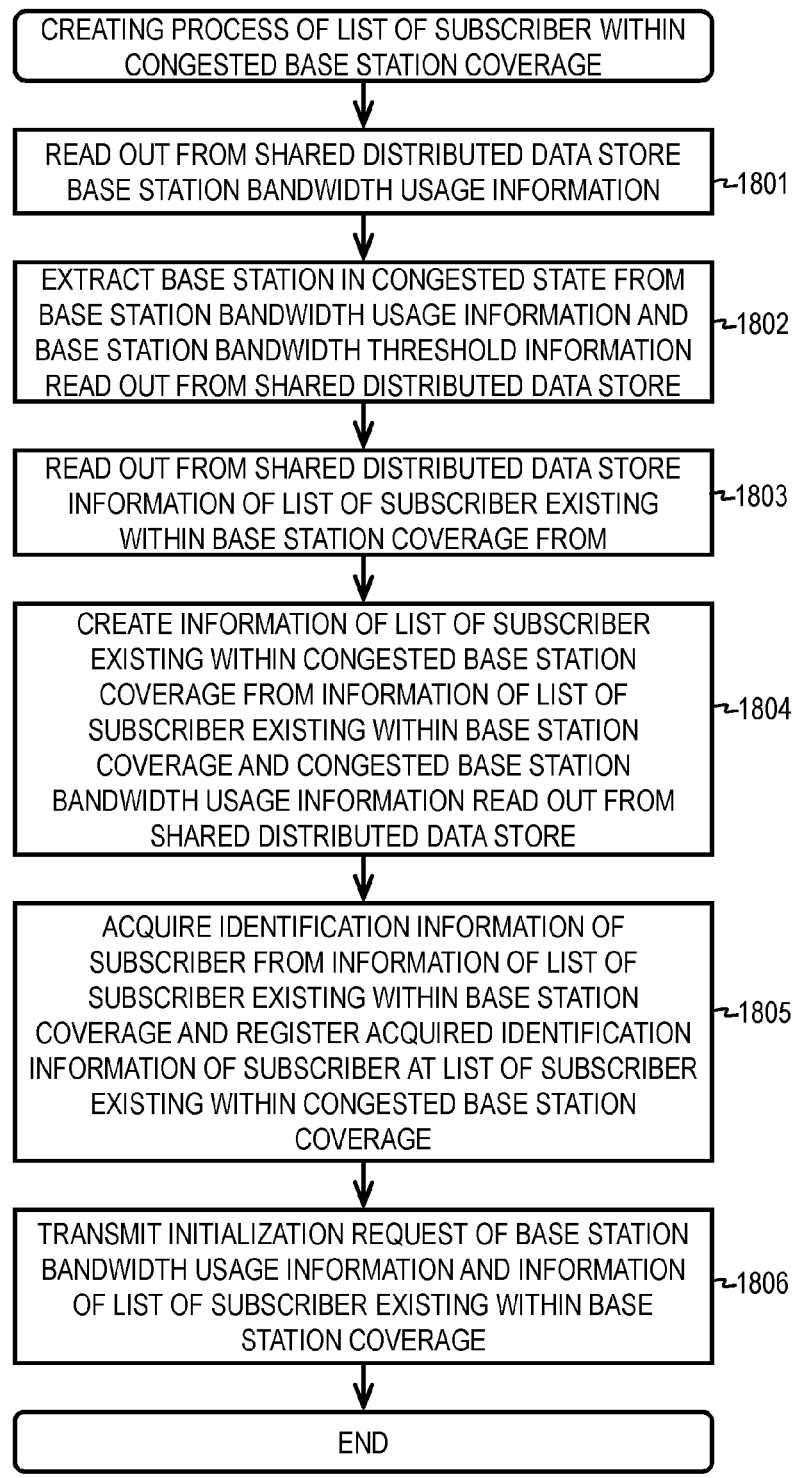
FIG. 18 is a flowchart of a creating process of list of subscriber existing within congested base station coverage which is executed by a program for creating process of list of subscriber existing within congested base station coverage of the CDS according to embodiment 1.

FIG. 18 is a flowchart of the creating process of list of subscriber existing within congested base station coverage which is executed by the program for creating process of list of subscriber existing within congested base station coverage 711 of the CDS 310 according to embodiment 1.

Firstly, the program for creating process of list of subscriber existing within congested base station coverage 711 reads out all of the records of the base station bandwidth usage information 306 from the shared distributed data store 303 (1801).

Next, the program for creating process of list of subscriber existing within congested base station coverage 711 determines as to whether or not the total value of the used bandwidth of each read that is read out in the process of Step 1802 is equal to or greater than the threshold of the record of base station bandwidth threshold information 713 that corresponds with the identification information of the base station 102 of each record. The program for creating process of list of subscriber existing within congested base station coverage 711 determines, when there is a record, out of the record that was read out in the process of Step 1801, whose total value of the used bandwidth is equal to or greater than the threshold of base station bandwidth threshold information 713, that congestion occurred at the base station 102 identified by the identification information of the base station 102 of the record, extracts all the records whose total value of the used bandwidth is equal to or greater than base station bandwidth threshold information 713, and registers the extracted records at the congested base station bandwidth usage information 712 (1802).

Next, the program for creating process of list of subscriber existing within congested base station coverage 711 reads out all of the records of the information of list of subscriber existing within base station coverage 307 from the shared distributed data store 303 (1803).

Next, the program for creating process of list of subscriber existing within congested base station coverage 711 acquires a record that corresponds with the identification information of the base station registered at the congested base station bandwidth usage information 712 out of the record read out in the process of Step 1803, and registers the acquired record at the information of list of subscriber existing within congested base station coverage 714 (1804).

Next, the program for creating process of list of subscriber existing within congested base station coverage 711 acquires the subscriber identification information of all of the records of the information of list of subscriber existing within congested base station coverage 714, and registers the acquired subscriber identification information at the list of subscriber existing within congested base station coverage 715 (1805).

Next, the program for creating process of list of subscriber existing within congested base station coverage 711 outputs to the shared distributed data store 303 an initialization request for initializing the contents of the base station bandwidth usage information 306 and the information of list of subscriber existing within base station coverage 307 of the shared distributed data store 303 (1806), and ends the creating process of list of subscriber existing within congested base station coverage.

Figure 19:
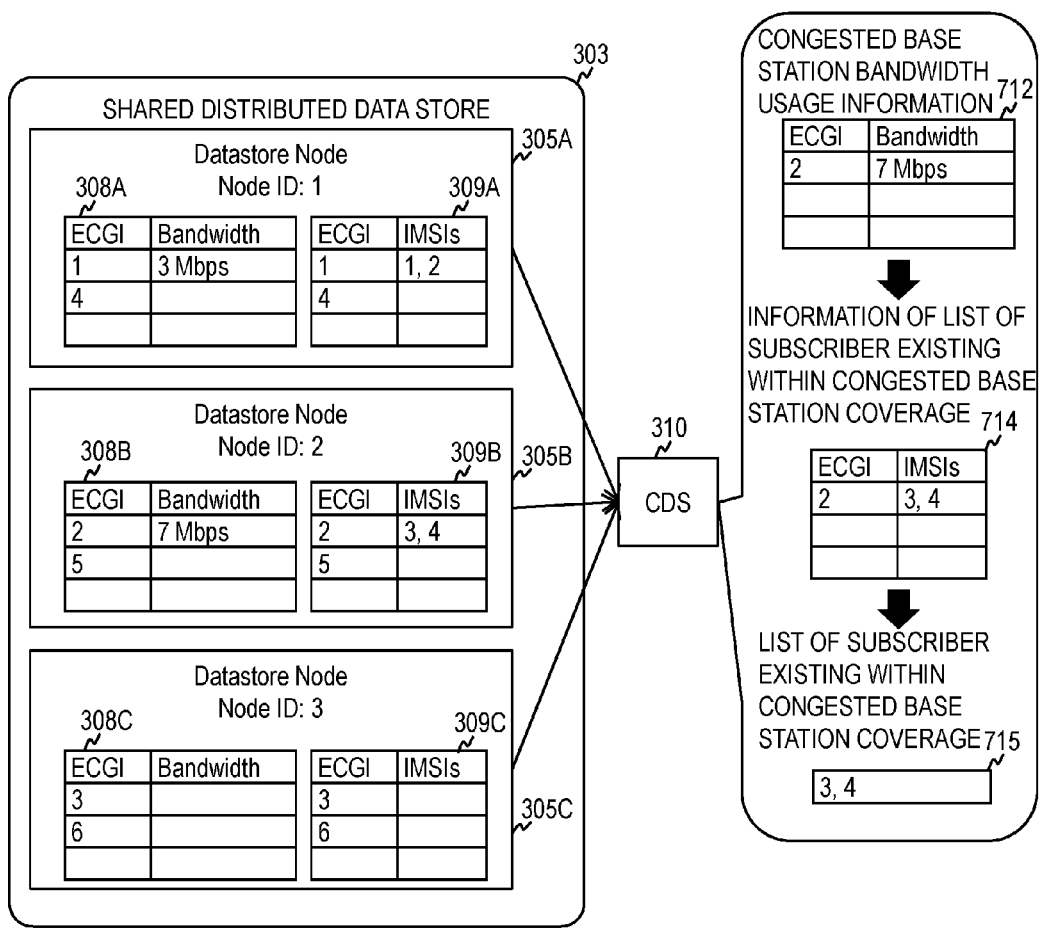
FIG. 19 is an explanatory diagram of the creating process of list of subscriber existing within congested base station coverage according to embodiment 1.

FIG. 19 is an explanatory diagram of the creating process of list of subscriber existing within congested base station coverage according to embodiment 1.

The used bandwidth of the ECGI 1 which is 3 Mbps is registered at the element data store 308A of the base station bandwidth usage information 306 of the node 305A, and the subscribers IMSI 1 and IMSI 2 that are connected to the ECGI 1 are registered at the element data store 309A of the information of list of subscriber existing within base station coverage 307 of the node 305A.

Also, the used bandwidth of the ECGI 2 which is 7 Mbps is registered at the element data store 308B of the base station bandwidth usage information 306 of the node 305B, and the subscribers IMSI 3 and IMSI 4 that are connected to the ECGI 2 are registered at the element data store 309B of the information of list of subscriber existing within base station coverage 307 of the node 305B.

The CDS 310 reads out from the shared distributed data store 303 the base station bandwidth usage information 306 and the information of list of subscriber existing within base station coverage 307. If the threshold of the ECGI 1 and the ECGI 2 is registered as 5 Mbps at base station bandwidth threshold information 713, the used bandwidth of the ECGI 2 is greater than the threshold, and congestion is occurring at the ECGI 2. Accordingly, the CDS 310 acquires the record of the ECGI 2 from the base station bandwidth usage information 306, and registers the acquired record at the congested base station bandwidth usage information 712. Accordingly, the ECGI 2 and the used bandwidth 7 Mbps will be registered at the congested base station bandwidth usage information 712.

Next, the CDS 310 acquires the record of the ECGI 2 from the information of list of subscriber existing within base station coverage 307, and registers the acquired record at the information of list of subscriber existing within congested base station coverage 714. Accordingly, the ECGI 2, the IMSI 3, and the IMSI 4 will be registered at the information of list of subscriber existing within congested base station coverage 714.

Next, the CDS 310 acquires the IMSI 1 and the IMSI 4 that are registered at the information of list of subscriber existing within congested base station coverage 714, and registers the acquired the IMSI 1 and the IMSI 4 at the list of subscriber existing within congested base station coverage 715.

Figure 20:
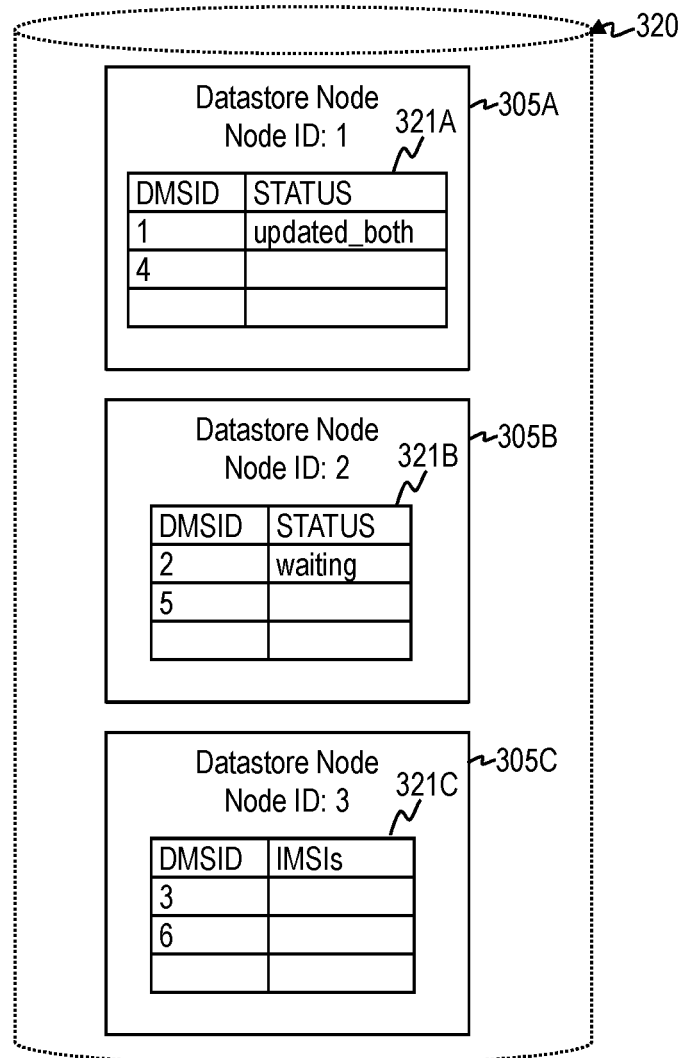
FIG. 20 is an explanatory diagram of writing status management information according to embodiment 1.

Next, a modification of the creating process of list of subscriber existing within congested base station coverage will be described with reference to FIG. 20. While it is described above the creating process of list of subscriber existing within congested base station coverage is executed at predetermined intervals, the creating process of list of subscriber existing within congested base station coverage according to the present modification is executed at the timing when all of the DMSs 302 write the base station bandwidth information and the subscriber information to the shared distributed data store 303.

According to the present modification, each node 305 of the shared distributed data store 303 stores therein writing status management information 320 in which the writing status of the shared distributed data store 303 of each DMS 302 is registered. FIG. 20 is an explanatory diagram of writing status management information 320 according to embodiment 1.

Writing status management information 320 is stored at the plurality of nodes 305A through 305C of the shared distributed data store 303 in a distributed manner. The element data store 321A of writing status management information 320 included at the node 305A stores therein the writing status of the DMS 302 that is identified by a DMSID, which includes the identification information of the DMS 302, of 1 (e.g., DMSID 1) which is the remainder of the DMSID divided by 3, the element data store 321B of writing status management information 320 included at the node 305B stores therein the writing status of the DMS 302 that is identified by a DMSID of 2 (e.g., DMSID 2) which is the remainder of the DMSID divided by 3, and the element data store 321C of writing status management information 320 included at the node 305C stores therein the writing status of the DMS 302 that is identified by a DMSID of 0 (e.g., DMSID 1) which is the remainder of the DMSID divided by 3.

Writing status management information 320 includes the DMSID and a STATUS, where the DMSID registers therein the identification information of each DMS 302, and the STATUS registers therein the writing status of the DMS 302. The writing status registered at the STATUS includes waiting, updated_bandwidths, updated_users, and updated_both. The waiting indicates that none of the information is written in the shared distributed data store 303. The updated_bandwidths indicates that the DMS 302 has executed only the base station bandwidth usage information update process. The updated_users indicates that the DMS 302 has executed only the information of list of subscriber existing within base station coverage update process. The updated_both indicates that the DMS 302 has executed the base' station bandwidth usage information update process and the information of list of subscriber existing within base station coverage update process.

Next, a process for the DMS 302 to update writing status management information 320 will be described.

The DMS 302 updates, when an ACK is inputted from the shared distributed data store 303, the STATUS of the record that corresponds with the identification information of the DMS 302 of writing status management information 320 after executing the process of Step 1404 illustrated in FIG. 14.

To be more specific, the DMS 302 reads out from the shared distributed data store 303 a record of writing status management information 320 that corresponds with the identification information thereof. Then, when waiting is registered at the STATUS of the record that was read out, the DMS 302 writes the updated_bandwidths over the existing STATUS of the record, and overwrites the existing record of writing status management information 320 of the shared distributed data store 303 with the record having the new STATUS. On the other hand, when updated_users is registered at the STATUS of the record that was read out, the DMS 302 writes the updated_both over the existing STATUS, and overwrites the existing record of writing status management information 320 of the shared distributed data store 303 with the record having the new STATUS.

Also, the DMS 302 updates, when an ACK is inputted from the shared distributed data store 303, the STATUS of the record that corresponds with the identification information of the DMS 302 of writing status management information 320 after executing the process of Step 1604 illustrated in FIG. 16.

To be more specific, the DMS 302 reads out from the shared distributed data store 303 a record of writing status management information 320 that corresponds with the identification information thereof. Then, when waiting is registered at the STATUS of the record that was read out, the DMS 302 writes the updated_users over the existing STATUS of the record, and overwrites the existing record of writing status management information 320 of the shared distributed data store 303 with the record having the new STATUS. On the other hand, when updated_bandwidths is registered at the STATUS of the record that was read out, the DMS 302 writes the updated_both over the existing STATUS, and overwrites the existing record of writing status management information 320 of the shared distributed data store 303 with the record having the new STATUS.

The CDS 310 retains the identification information of the DMS 302 that is necessary for executing the creating process of list of subscriber existing within congested base station coverage. The CDS 310 reads out from the shared distributed data store 303 of writing status management information 320 at predetermined time intervals, and acquires the identification information of the DMS 302 in which the updated_both is registered for STATUS. Then, the CDS 310 executes, in a case the acquired identification information of all of the DMSs 302 correspond with all of the DMSs 302 necessary for executing the creating process of list of subscriber existing within congested base station coverage, the creating process of list of subscriber existing within congested base station coverage. The time interval at which the CDS 310 reads out writing status management information 320 from the shared distributed data store 303 is set shorter than the time interval at which the DPI 301 notifies the DMS 302 with the base station bandwidth information and the subscriber information.

In order for the creating process of list of subscriber existing within congested base station coverage to be executed after the base station bandwidth usage information 306 and the information of list of subscriber existing within base station coverage 307, the time interval at which the creating process of list of subscriber existing within congested base station coverage according to embodiment 1 is executed is set longer than the time interval at which the DPI 301 notifies the DMS 302 with the base station bandwidth information and the subscriber information, however, according to the present modification, the creating process of list of subscriber existing within congested base station coverage may be executed immediately just when the base station bandwidth usage information 306 and the information of list of subscriber existing within base station coverage 307 are updated. Accordingly, it enables an early identification of the base station 102 where congestion is occurring, and early change of control policy or charge rule for the subscriber who is connected to the base station 102 where congestion is occurring.

Note that the present modification is applicable to an embodiment 3 in which the plurality of DMSs 302 are arranged and which will be described below.

Embodiment 2

The present embodiment will be described referencing to an example in which the CDS 310 and the plurality of DMSs 302 are mounted on a single computer (CMS 2100), and the base station bandwidth usage information 306 and the information of list of subscriber existing within base station coverage 307 are stored at a single storage area.

Figure 21:
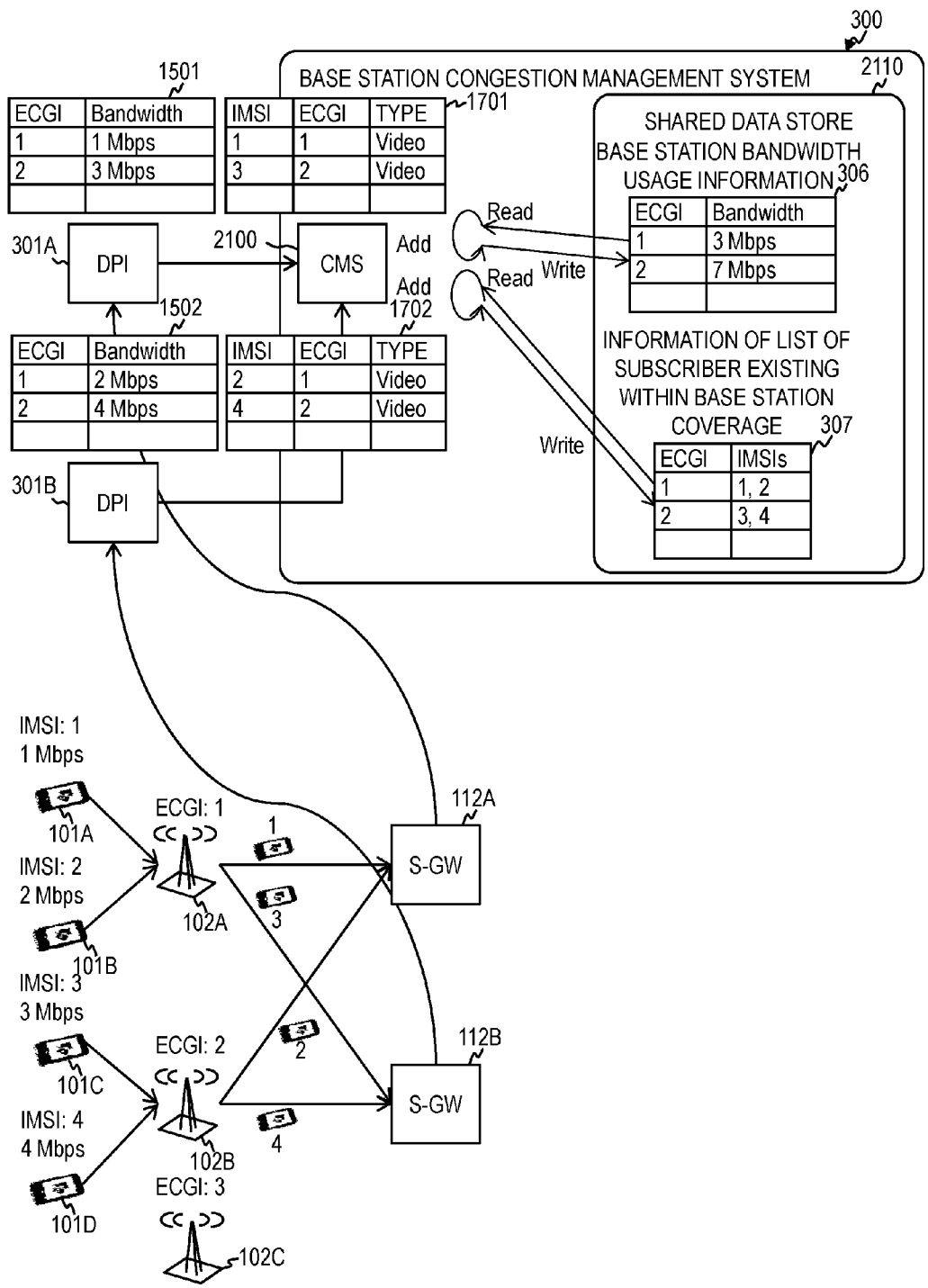
FIG. 21 is an explanatory diagram of a configuration of a base station congestion management system, and an update process of the base station bandwidth usage information and the information of list of subscriber existing within base station coverage according to embodiment 2.

FIG. 21 is an explanatory diagram of a configuration of the base station congestion management system 300, and an update process of the base station bandwidth usage information 306 and the information of list of subscriber existing within base station coverage 307 according to embodiment 2. Note that the configuration in FIG. 21 that is the same as the configuration in embodiment 1 will be given the same reference numeral as that in embodiment 1, and a description thereof will be omitted.

The base station congestion management system 300 according to the present embodiment includes a congestion management server (CMS: Congestion Management Server) 2100 instead of the CDS 310 and the plurality of DMSs 302 of embodiment 1, and a shared data store 2110 instead of the shared distributed data store 303 of embodiment 1.

While the shared distributed data store 303 according to embodiment 1 stores the base station bandwidth usage information 306 and the information of list of subscriber existing within base station coverage 307 at the plurality of nodes 305 in a distributed manner, the shared data store 2110 according to the present embodiment stores the base station bandwidth usage information 306 and the information of list of subscriber existing within base station coverage 307 at a single storage area. Note that the storage area at which the base station bandwidth usage information 306 and the information of list of subscriber existing within base station coverage 307 are stored is indicated as a shared data store so as to include a concept of the shared distributed data store 303 and the shared data store 2110.

The CMS 2100 includes the features of the DMS 302 and the CDS 310 of embodiment 1. In other words, the CMS 2100 executes the base station bandwidth usage information update process, information of list of subscriber existing within base station coverage update process, and the creating process of list of subscriber existing within congested base station coverage.

To be more specific, the CMS 2100 receives from the plurality of DPIs 301 the base station bandwidth information (1501 and 1502) and subscriber information (1701 and 1702). Then, the CMS 2100 totals the used bandwidth included in the received base station bandwidth information for each base station 102, and writes the total value to the base station bandwidth usage information 306 of the shared data store 2110. The CMS 2100 writes, based on the received subscriber information, the subscriber identification information of the user terminal 101 that is connected to each base station 102 and that transmits and receives data of a specific type to the information of list of subscriber existing within base station coverage 307 of the shared data store 2110. Note that these processes are the same as the processes illustrated in FIG. 14 and FIG. 16.

Since the base station bandwidth usage information 306 and the information of list of subscriber existing within base station coverage 307 are not stored in a distributed manner, the CMS 2100 is not required to retain the distribution hash information 513.

Then, the CMS 2100 executes the creating process of list of subscriber existing within congested base station coverage, creates the list of subscriber existing within congested base station coverage 715, and notifies the PCRF 311 with the list of subscriber existing within congested base station coverage 715 that was created.

Embodiment 3

The present embodiment will be described referencing to an example in which the base station bandwidth usage information 306 and the information of list of subscriber existing within base station coverage 307 are stored at a single storage area.

Figure 22:
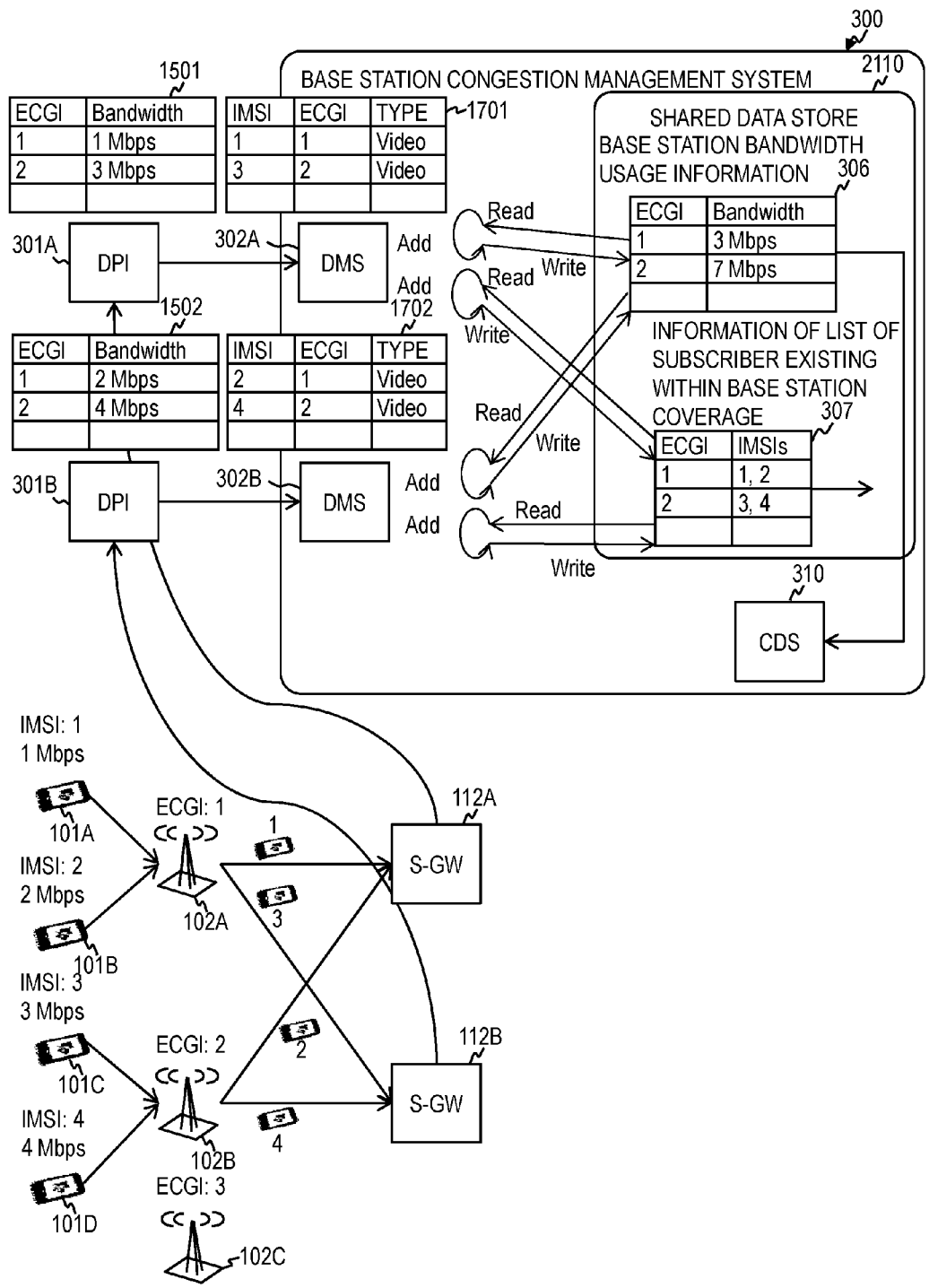
FIG. 22 is an explanatory diagram of a configuration of the base station congestion management system, and an update process of the base station bandwidth usage information and the information of list of subscriber existing within base station coverage according to embodiment 3.

FIG. 22 is an explanatory diagram of a configuration of the base station congestion management system 300, and an update process of the base station bandwidth usage information 306 and the information of list of subscriber existing within base station coverage 307 according to embodiment 3. Note that the configuration in FIG. 22 that is the same as the configurations in embodiment 1 and in embodiment 2 will be given the same reference numerals as those in embodiment 1 and embodiment 2, and a description thereof will be omitted.

As described in embodiment 2, the shared data store 2110 stores the base station bandwidth usage information 306 and the information of list of subscriber existing within base station coverage 307 at a single storage area.

Since the base station bandwidth usage information 306 and the information of list of subscriber existing within base station coverage 307 are not stored in a distributed manner, the DMS 302 is not required to retain the distribution hash information 513.

Embodiment 4

The present embodiment will be described referencing to an example in which the CDS 310 and the plurality of DMSs 302 are mounted on a single computer (CMS 2100).

Figure 23:
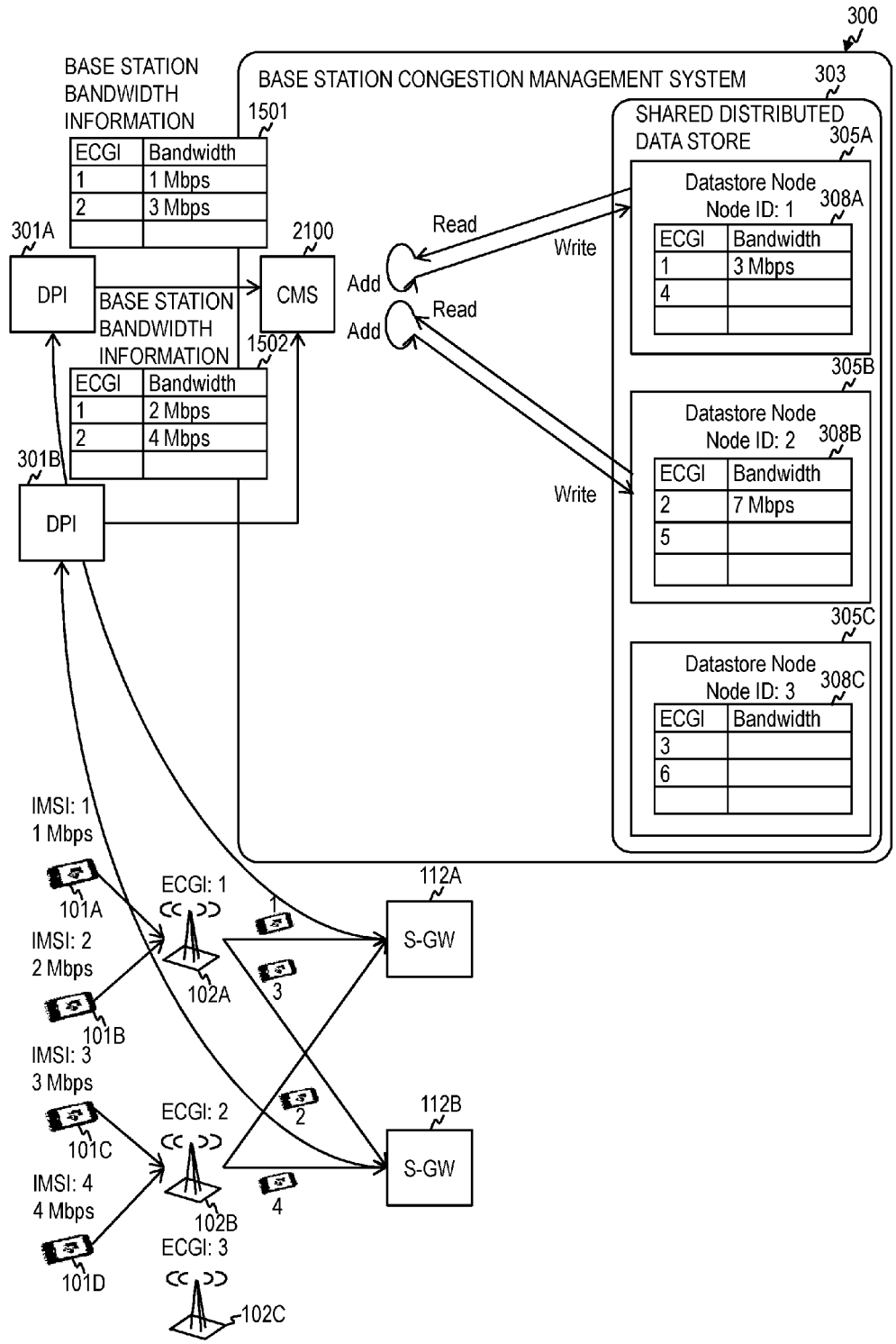
FIG. 23 is an explanatory diagram of a configuration of the base station congestion management system, and an update process of the base station bandwidth usage information according to embodiment 4.
Figure 24:
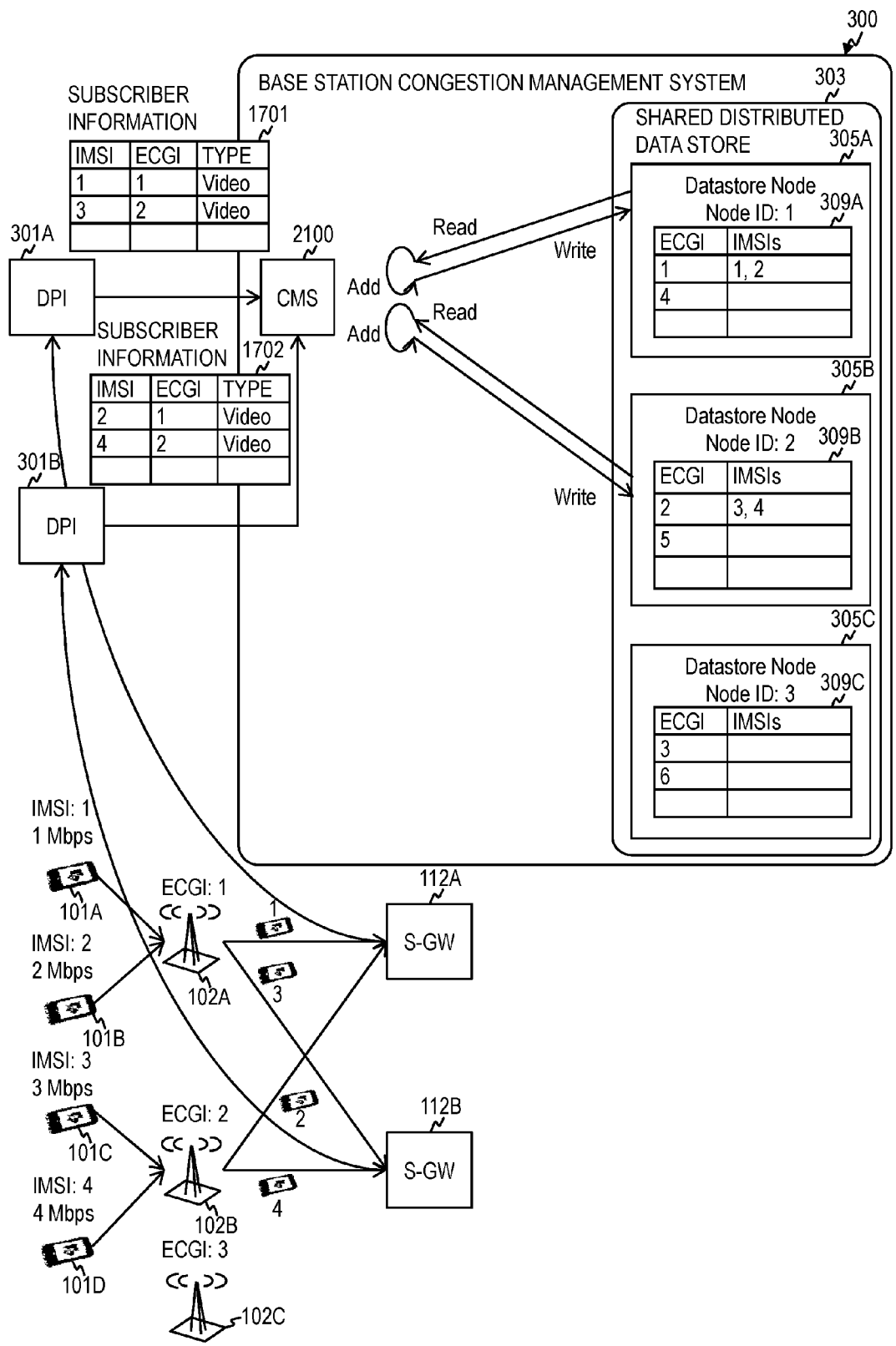
FIG. 24 is an explanatory diagram of a configuration of the base station congestion management system, and an update process of the information of list of subscriber existing within base station coverage according to embodiment 4.

FIG. 23 is an explanatory diagram of a configuration of the base station congestion management system 300, and an update process of the base station bandwidth usage information 306 according to embodiment 4. FIG. 24 is an explanatory diagram of a configuration of the base station congestion management system 300, and an update process of the information of list of subscriber existing within base station coverage 307 according to embodiment 4. Note that the configurations in FIG. 23 and FIG. 24 that are the same as the configurations in embodiment 1 through embodiment 3 will be given the same reference numerals as those in embodiment 1 through embodiment 3, and a description thereof will be omitted.

The CMS 2100 executes the base station bandwidth usage information update process, and the information of list of subscriber existing within base station coverage update process each time the base station bandwidth information and the subscriber information are received from the plurality of DPIs 301. That is, even when the CMS 2100 receives the base station bandwidth information and the subscriber information from one of the DPIs 301 and executes the base station bandwidth usage information update process, and the information of list of subscriber existing within base station coverage update process, the CMS 2100 is required to receive from the rest of the DPIs the base station bandwidth information and the subscriber information, and execute the base station bandwidth usage information update process, and the information of list of subscriber existing within base station coverage update process until the next timing at which the base station bandwidth information and the subscriber information is received from the DPI 301.

On the other hand, in a case where one DMS 302 receives from one DPI 301 the base station bandwidth information and the subscriber information as in embodiment 1 and embodiment 3, once the DMS 302 receives the base station bandwidth information and the subscriber information, and executes the base station bandwidth usage information update process, and the information of list of subscriber existing within base station coverage update process, since the base station bandwidth information and the subscriber information will not be received from the DPI 301 until the next timing to notify the base station bandwidth information and the subscriber information of the DPI 301, the base station bandwidth usage information update process, and the information of list of subscriber existing within base station coverage update process will not be executed.

Embodiment 5

The present embodiment will be described referencing to an example in which the used bandwidth of a plurality of base stations 102 is grouped and registered at a single record of base station bandwidth usage information 2500, and the used bandwidth of the base station 102 is written in units of groups.

Figure 25:
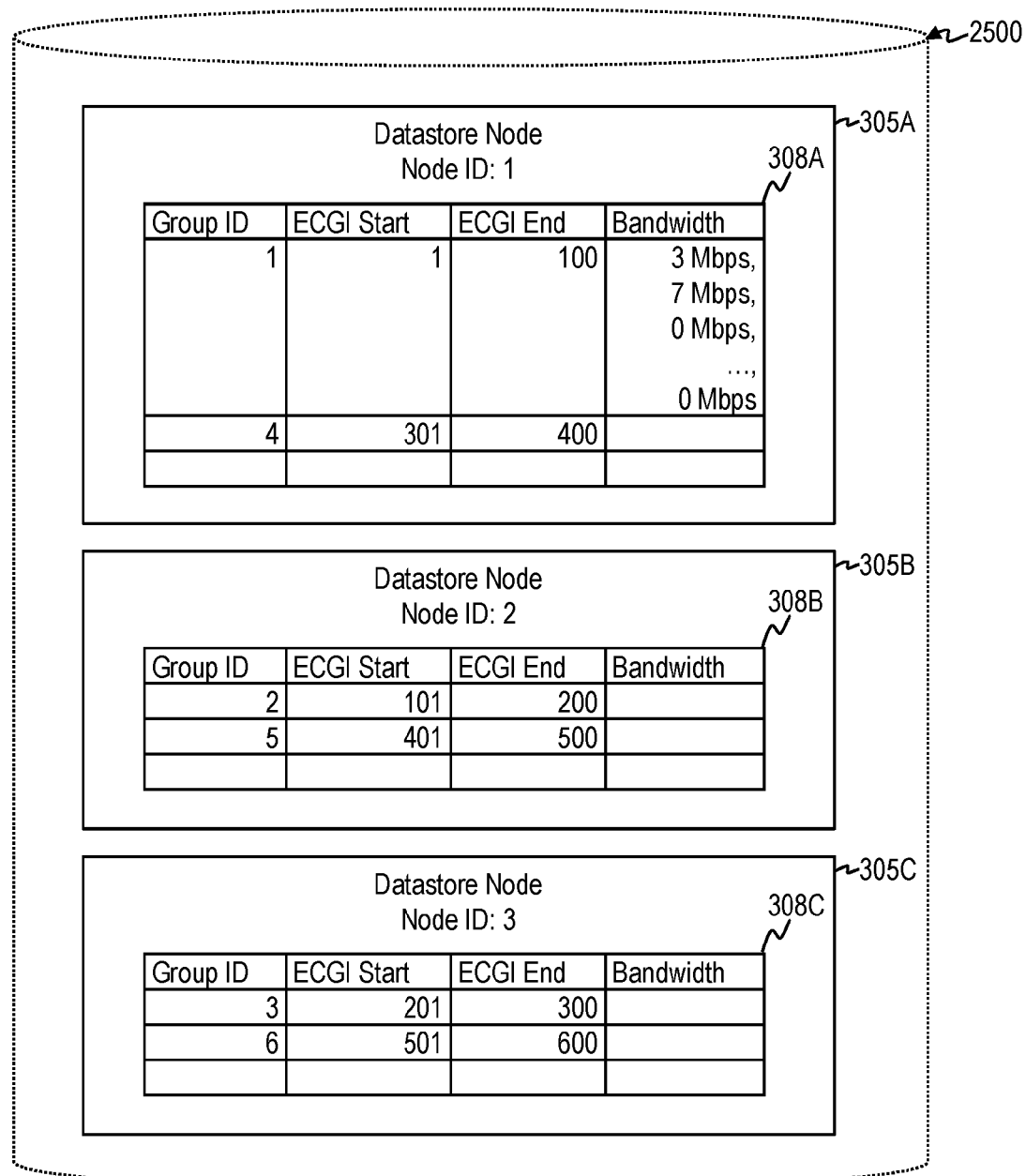
FIG. 25 is an explanatory diagram of the base station bandwidth usage information according to embodiment 5.

FIG. 25 is an explanatory diagram of the base station bandwidth usage information 2500 according to embodiment 5.

The base station bandwidth usage information 2500 is stored at the plurality of nodes 305A through 305C in the same manner as in embodiment 1. The base station bandwidth usage information 2500 includes a group ID, an ECGI Start, an ECGI End, and a Bandwidth. The Group ID registers therein the identification information of a group. Note that the group identification is configured so that it does not overlap with one another and includes information that is uniquely identifiable for each group of the identification. The ECGI Start and the ECGI End register therein the identification of the first base station 102 and the identification of the last base station 102 that belong to the group that is identified by the group identification. The Bandwidth registers therein the total value of the used bandwidth of each base station 102 that belongs to the group that is identified by the group identification. The identification information of each base station 102 and the total value of the used bandwidth of each base station 102 registered at the Bandwidth are associated with one another. According to FIG. 25 the total value of the used bandwidth that is registered first in the Bandwidth is associated with the ECGI Start, and the total value of the used bandwidth that is registered next in the Bandwidth is associated with the ECGI that is subsequent to the ECGI Start.

One record of the base station bandwidth usage information 2500 registers therein the used bandwidth of the plurality of base stations 102 that belong to one group. According to the example illustrated in FIG. 25, one record of the base station bandwidth usage information 2500 registers therein the used bandwidth of 100 base stations 102. At the record having one group ID the used bandwidth of the ECGI 1 through ECGI 100 is registered, 3 Mbps is registered as the used bandwidth of the ECGI 1, and 7 Mbps is registered as the used bandwidth of the ECGI 2.

Note that the node 305 where writing will take place based on the group identification information with the base station bandwidth usage information 2500. According to FIG. 25, the element data store 308A of the base station bandwidth usage information 2500 included at the node 305A registers therein the used bandwidth of the group in which the remainder of dividing the group identification information by 3 is 1, the element data store 308B of the base station bandwidth usage information 2500 included at the node 305B registers therein the used bandwidth of the group in which the remainder of dividing the group identification information by 3 is 2, and the element data store 308C of the base station bandwidth usage information 2500 included at the node 305C registers therein the used bandwidth of the group in which the remainder of dividing the group identification information by 3 is 3.

Figure 26:
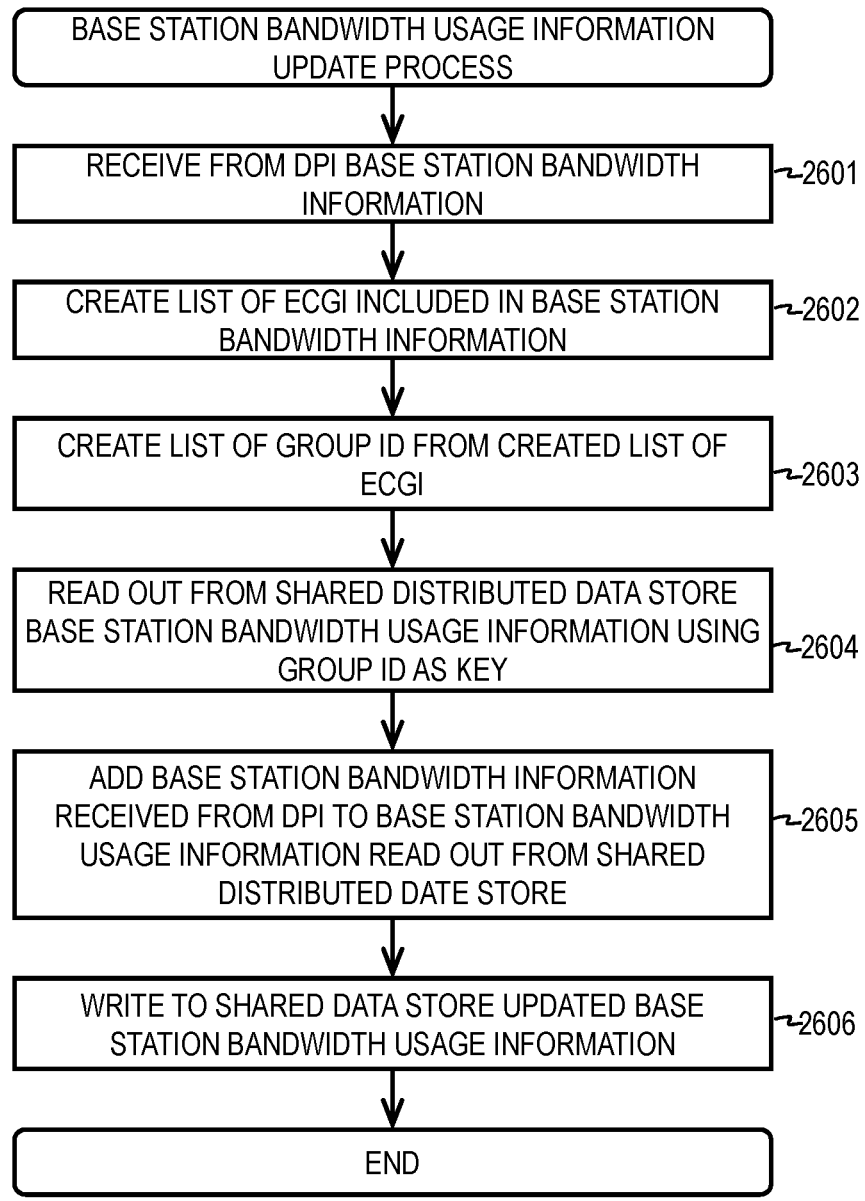
FIG. 26 is a flowchart of the base station bandwidth usage information update process executed by the base station bandwidth usage information update process program of the DMS according to embodiment 1 of embodiment 5.

FIG. 26 is a flowchart of the base station bandwidth usage information update process executed by the base station bandwidth usage information update process program 511 of the DMS 302 according to embodiment 1 of embodiment 5.

Firstly, in the base station bandwidth usage information update process program 511 the base station bandwidth information is inputted from the DPI 301 (2601).

Next, the base station bandwidth usage information update process program 511 acquires the identification information of all of the base stations 102 included in the inputted base station bandwidth information, and creates a list of the acquired identification information of the base station 102 (2602). Then, the base station bandwidth usage information update process program 511 identifies the identification information of the group to which the identification information of each base station 102 included in the list that was created in the process of Step 2602 belongs, deletes from the identified identification information of the group the identification information of the group that overlap, and creates the list of identification information of group (2603).

Next, the base station bandwidth usage information update process program 511 reads out the record of matching identification information of the group included in the list that was created in the process of Step 2603 out of the record of the base station bandwidth usage information 2500 of the shared distributed data store 303 (2604). The DMS 302 according to the present embodiment retains distribution hash information of the identification information of group similar to the distribution hash information 513 of the identification information of the base station 102 illustrated in FIG. 5. In the process of Step 2604, the base station bandwidth usage information update process program 511 refers to the distribution hash information of the identification information of group so as to seek whether or not to output a read out request to any one of the nodes 305 of the shared distributed data store 303 for each piece of identification information of group included in the list that was created in the process of Step 2603.

Next, the base station bandwidth usage information update process program 511 identifies the total value of the used bandwidth of the base station 102 that corresponds with the identification of the base station included in the base station bandwidth information that is inputted out of the total value of the used bandwidth of each base station of Bandwidth of the record of the base station bandwidth usage information 2500 that was read out in the process of Step of 2604, and adds to the identified total value of the used bandwidth the value of the base station bandwidth information that was inputted (2605).

Next, the base station bandwidth usage information update process program 511 overwrites the base station bandwidth usage information 2500 of the shared distributed data store 303 with the record of the base station bandwidth information to which the value of the used bandwidth is added (2606), and ends the base station bandwidth usage information update process.

As described above, since the total value of the used bandwidth of a plurality of base stations 102 is registered at a single record of the base station bandwidth usage information 2500, it becomes possible to reduce the number of times to write to the shared distributed data store 303 of the DMS 302, and prevent writing overhead to the shared distributed data store 303 if the DMS 302. For example, according to embodiment 1, when one of the DMSs 302 receives from the DPI 301 the base station used bandwidth which includes the used bandwidth of 10 base stations 102 (ECGI 1 through ECGI 10), the writing process to the shared distributed data store 303 of the DMS 302 will be required 10 times. According to the present embodiment, however, since the used bandwidth of the 10 base stations 102 (ECGI 1 through ECGI 10) is grouped at a single record of the base station bandwidth usage information 2500, the DMS 302 is required to execute the writing process to the shared distributed data store 303 only once.

The present embodiment enables the speed of the base station bandwidth usage information process to be increased particularly when it is applied to a system that includes an object storage where the shared distributed data store 303 creates copies of the records among the nodes 305 and stores the same.

Note that although the present embodiment is described referencing to an example where a predetermined scope of successive ECGIs belong to a group, the present invention is not limited thereto. For example, the identification information of the base station 102 may be inputted to a hash function so as to group the base stations 102 whose identification information includes a predetermined value.

Although the present disclosure has been described with reference to exemplary embodiments, those skilled in the art will recognize that various changes and modifications may be made in form and detail without departing from the spirit and scope of the claimed subject matter.

For instance, the embodiment given above is a detailed description that is written for easy understanding of this invention, and this invention is not necessarily limited to a mode that includes all the components described. Replacing some components of one embodiment with components of another embodiment is also an option. Components of one embodiment may be added with components of another embodiment. For some components in each embodiment, other components may be added or deleted or may substitute.

Some of or all of the components, functions, processing parts, processing measures, and the like described above may be implemented by hardware by, for example, designing those in the form of an integrated circuit. Alternatively, the components, functions, and the like described above may be implemented by software by having a processor interpret and execute programs that respectively implement the described functions. Programs, tables, files, and other types of information for implementing the described functions can be put in a memory, a recording device such as a hard disk or a solid state drive (SSD), or a recording medium such as an IC card, an SD card, or a DVD.

The control lines and information lines given above are ones deemed as necessary to describe this invention, and not all of control lines and information lines of a product are necessarily given above. It may be considered that almost all components are connected to one another in actuality.

What is claimed is:

1. A base station congestion management system configured to determine whether congestion is occurring at a base station in a network in which a plurality of base stations distribute data from a user terminal to a plurality of gateway apparatuses,
   wherein a plurality of communication monitoring apparatuses collect base station bandwidth information which includes identification information of at least one base station which communicates with the gateway apparatus managed by each communication monitoring apparatus and a used bandwidth between the gateway apparatus and the at least one base station, and subscriber information which includes subscriber identification information of the user terminal and identification information of a base station with which the user terminal is connected,
   the base station congestion management system comprising:
   at least one data management unit to which the plurality of communication monitoring apparatuses input the base station bandwidth information and the subscriber information;
   a shared data store configured to store base station bandwidth usage information which registers therein a total value of a used bandwidth of the base station bandwidth information inputted to the data management unit from the plurality of communication monitoring apparatuses for each base station, and information of list of subscriber existing within base station coverage which registers therein a list of subscriber identification information of a user terminal connected with the base station for each base station; and
   a congestion management unit configured to determine whether congestion is occurring at the base station,
   wherein the data management unit calculates a total value of a used bandwidth for each base station based on the base station bandwidth information inputted from the communication monitoring apparatus,
   wherein the data management unit updates the base station bandwidth usage information in the shared data store based on the calculated total value,
   wherein the data management unit updates the list of subscriber identification information of a user terminal connected with the base station of the information of the list of subscriber existing within base station coverage in the shared data store based on the subscriber information inputted from the communication monitoring apparatus,
   wherein the congestion management unit determine whether congestion is occurring at the base station based on the total value of the used bandwidth for each base station of the base station bandwidth usage information in the shared data store, and
   wherein the congestion management unit refers to the information of list of subscriber existing within base station coverage in the shared data and identifies the subscriber identification information of the user terminal connected with the base station where congestion is occurring.

2. The base station congestion management system according to claim 1,
   wherein the system comprises a plurality of data management units,
   wherein the plurality of data management units, in a case where the base station bandwidth information is inputted from the communication monitoring apparatus, each execute a base station bandwidth usage information update process,
   wherein the base station bandwidth usage information update process includes a step that each data management unit reads out from the base station bandwidth usage information in the shared data store the total value of the used bandwidth corresponding with the identification information of the base station included in the inputted base station bandwidth information, a step that each data management unit adds the used bandwidth included in the inputted base station bandwidth information to the total value of the used bandwidth which is read out, and a step that each data management unit updates the total value of the used bandwidth corresponding to the identification information of the base station of the base station bandwidth usage information to include the added value, and
   wherein the plurality of data management units execute in parallel the base station bandwidth usage information update process.

3. The base station congestion management system according to claim 2,
   wherein the plurality of data management units, in a case where the subscriber information is inputted from the communication monitoring apparatus, each execute information of list of subscriber existing within base station coverage update process,
   wherein the information of list of subscriber existing within base station coverage update process includes a step that each data management unit reads out from the information of list of subscriber existing within base station coverage in the shared data store a list of the subscriber identification information corresponding with the identification information of the base station included in the inputted subscriber information, a step that each data management unit adds the subscriber identification information included in the inputted subscriber information to the read out list of the subscriber identification information, and a step that each data management unit updates the list of the subscriber identification information corresponding to the identification information of the base station of the information of list of subscriber existing within base station coverage to include the list of the added subscriber identification information, and
   wherein the plurality of data management units execute in parallel the information of list of subscriber existing within base station coverage update process.

4. The base station congestion management system according to claim 3,
   wherein the subscriber information collected by the communication monitoring apparatus further includes type identification information configured to indicate a type of data transmitted and received by a user terminal of the subscriber, and
   wherein the information of list of subscriber existing within base station coverage update process includes a step that the data management unit adds, to the list of the read out subscriber identification information, the subscriber identification information whose type, which is identified by the type identification information included in the inputted subscriber information, includes a predetermined type.

5. The base station congestion management system according to claim 3, wherein the data management unit, in a case where an execution of the base station bandwidth usage information update process and the information of list of subscriber existing within base station coverage update process is completed, writes to the shared data store writing status information which includes the identification information thereof and information that both the processes have been completed, wherein the congestion management unit holds the identification information of the data management unit necessary for executing a determination process of whether congestion is occurring at the base station, wherein the congestion management unit refers to the writing status information in the shared data store, and determines whether information indicating that the both processes, which correspond to all of the identification information of the data management unit necessary for executing the determination process for whether congestion is occurring at the base station, are completed is registered therein, and wherein the congestion management unit, in a case where it is determined that the information indicating that the both processes, which correspond to all of the identification information of the data management unit necessary for executing the determination process for whether congestion is occurring at the base station, are completed is registered, determines whether congestion is occurring at the base station.

6. The base station congestion management system according to claim 1,
wherein the shared data store includes a plurality of nodes having a storage area, and
wherein the base station bandwidth usage information and the information of list of subscriber existing within base station coverage are distributedly stored at the storage area at the plurality of nodes.

7. The base station congestion system according to claim 6,
wherein the data management unit determines the node to which the identification information of the base station and a total value of a used bandwidth of the base station are written based on the identification information of the base station included in the inputted base station bandwidth information, and
wherein the data management unit determines the node to which the identification information of the base station and the subscriber identification information of a user terminal connected with the base station are written based on the identification of the base station included in the inputted subscriber information, and
wherein an eNodeB ID and an ECGI are used as the identification information of the base station.

8. The base station congestion management system according to claim 1,
wherein the base station bandwidth usage information registers therein a plurality of total values of the used bandwidth of the base stations which are grouped,
wherein the data management unit identifies a group corresponding to each piece of identification information of all of the base stations included in the inputted base station bandwidth information,
wherein the data management unit reads out from the base station bandwidth usage information in the shared data store the identified group of total values of the used bandwidth of the base station,
wherein the data management unit adds the used bandwidth included in the inputted base station bandwidth information to the total value of the used bandwidth of the base station corresponding with the identification information of the base station included in the inputted base station bandwidth information out of the group of read out total values of the used bandwidth of the base station, and
wherein the data management unit updates the group of total values of the used bandwidth of the base station of the base station bandwidth usage information to include the group of total values of the used bandwidth of the base station to which the used bandwidth is added.

9. A base station congestion management method for a base station congestion management system to determine whether congestion is occurring at a base station in a network in which a plurality of base stations distribute data from a user terminal to a plurality of gateway apparatuses,
wherein a plurality of communication monitoring apparatuses collect base station bandwidth information which includes identification information of at least one base station which communicates with the gateway apparatus managed by each communication monitoring apparatus and a used bandwidth between the gateway apparatus and the at least one base station, and subscriber information which includes subscriber identification information of the user terminal and identification information of a base station with which the user terminal is connected, and
wherein the base station congestion management system includes:
at least one data management unit to which the plurality of communication monitoring apparatuses input the base station bandwidth information and the subscriber information;
a shared data store configured to store base station bandwidth usage information which registers therein a total value of used bandwidth of the base station bandwidth information inputted to the data management unit from the plurality of communication monitoring apparatuses for each base station, and information of list of subscriber existing within base station coverage which registers therein a list of subscriber identification information of a user terminal connected with the base station for each base station; and
a congestion management unit configured to determine whether congestion is occurring at the base station,
the base station congestion management method comprising:
calculating, by the data management unit, a total value of a used bandwidth for each base station based on the base station bandwidth information inputted from the communication monitoring apparatus;
updating, by the data management unit, the base station bandwidth usage information in the shared data store based on the calculated total value;
updating, by the data management unit, the list of subscriber identification information of a user terminal connected with the base station of the information of the list of subscriber existing within base station coverage in the shared data store based on the subscriber information inputted from the communication monitoring apparatus,
determining, by the congestion management unit, whether congestion is occurring at the base station based on the total value of the used bandwidth for each base station of the base station bandwidth usage information in the shared data store; and referring, by the congestion management unit, to the information of list of subscriber existing within base station coverage in the shared data and identifying the subscriber identification information of the user terminal connected with the base station where congestion is occurring.

10. The base station congestion management method according to claim 9,
  wherein the base station congestion management system includes a plurality of data management units,
  wherein the base station congestion management method includes the plurality of data management units, in a case where the base station bandwidth information is inputted from the communication monitoring apparatus, each executing a base station bandwidth usage information update process, and
  wherein the base station bandwidth usage information update process includes:
  reading out, by the data management unit, from the base station bandwidth usage information in the shared data store the total value of the used bandwidth corresponding with the identification information of the base station included in the inputted base station bandwidth information;
  adding, by the data management unit, the used bandwidth included in the inputted base station bandwidth information to the total value of the used bandwidth which is read out;
  updating, by the data management unit, the total value of the used bandwidth corresponding to the identification information of the base station of the base station bandwidth usage information to include the added value; and
  executing, by the plurality of data management units, in parallel the base station bandwidth usage information update process.

11. The base station congestion management method according claim 10,
  wherein the base station congestion management method includes executing, by each of the plurality of data management units, in a case where the subscriber information is inputted from the communication monitoring apparatus, information of list of subscriber existing within base station coverage update process, and
  wherein the information of list of subscriber existing within base station coverage update process includes:
  reading out, by the data management unit, from the information of list of subscriber existing within base station coverage in the shared data store a list of the subscriber identification information corresponding with the identification information of the base station included in the inputted subscriber information;
  adding, by the data management unit, the subscriber identification information included in the inputted subscriber information to the read out list of the subscriber identification information;
  updating, by the data management unit, the list of the subscriber identification information corresponding to the identification information of the base station of the information of list of subscriber existing within base station coverage to include the list of the added subscriber identification information; and
  executing, by the plurality of data management units, in parallel the information of list of subscriber existing within base station coverage update process.

12. The base station congestion management method according to claim 11,
  wherein the subscriber information collected by the communication monitoring apparatus further includes type identification information configured to indicate a type of data transmitted and received by a user terminal of the subscriber, and
  wherein the information of list of subscriber existing within base station coverage update process includes adding, by the data management unit, to the list of the read out subscriber identification information, the subscriber identification information whose type, which is identified by the type identification information included in the inputted subscriber information, includes a predetermined type.

13. The base station congestion management method according to claim 11,
  wherein the base station congestion management method includes:
  writing, by the data management unit, in a case where an execution of the base station bandwidth usage information update process and the information of list of subscriber existing within base station coverage update process is completed, to the shared data store writing status information which includes the identification information thereof and information that both the processes have been completed;
  holding, by the congestion management unit, the identification information of the data management unit necessary for executing a determination process of whether congestion is occurring at the base station,
  referring, by the congestion management unit, to the writing status information in the shared data store, and determining whether information indicating that the both processes, which correspond to all of the identification information of the data management unit necessary for executing the determination process for whether congestion is occurring at the base station, are completed is registered therein; and
  determining, by the congestion management unit, in a case where it is determined that the information indicating that the both processes, which correspond to all of the identification information of the data management unit necessary for executing the determination process for whether congestion is occurring at the base station, are completed is registered, whether congestion is occurring at the base station.

14. The base station congestion management method according to claim 9,
  wherein the shared data store includes a plurality of nodes having a storage area, and
  wherein the base station bandwidth usage information and the information of list of subscriber existing within base station coverage are distributedly stored at the storage area at the plurality of nodes.

15. The base station congestion management method according to claim 9,
  wherein the base station bandwidth usage information registers therein a plurality of total values of the used bandwidth of the base stations which are grouped, and
  wherein base station congestion management method includes:
  identifying, by the data management unit, a group corresponding to each piece of identification information of all of the base stations included in the inputted base station bandwidth information;
  reading out, by the data management unit, from the base station bandwidth usage information in the shared data store the identified group of total values of the used bandwidth of the base station;

adding, by the data management unit, the used bandwidth included in the inputted base station bandwidth information to the total value of the used bandwidth of the base station corresponding with the identification information of the base station included in the inputted base station bandwidth information out of the group of read out total values of the used bandwidth of the base station; and updating, by the data management unit, the group of total values of the used bandwidth of the base station of the base station bandwidth usage information to include the group of total values of the used bandwidth of the base station to which the used bandwidth is added.

* * * * *